(12) United States Patent
Rademakers

(10) Patent No.: US 9,371,897 B2
(45) Date of Patent: Jun. 21, 2016

(54) DRIVE APPARATUS OR SYSTEM

(71) Applicant: GustoMSC Resources B.V., Schiedam (NL)

(72) Inventor: Chris Rademakers, Schiedam (NL)

(73) Assignee: GustoMSC Resources B.V., Schiedam (NL)

( * ) Notice: Subject to any disclaimer, the term of this patent is extended or adjusted under 35 U.S.C. 154(b) by 0 days.

(21) Appl. No.: 14/176,087

(22) Filed: Feb. 8, 2014

(65) Prior Publication Data

US 2014/0155215 A1 Jun. 5, 2014

Related U.S. Application Data

(63) Continuation-in-part of application No. PCT/NL2013/050593, filed on Aug. 12, 2013.

(30) Foreign Application Priority Data

Aug. 10, 2012 (NL) .................................... 2009315

(51) Int. Cl.
*F16H 48/05* (2012.01)
*F16H 37/08* (2006.01)
*E02B 17/08* (2006.01)

(52) U.S. Cl.
CPC ........... *F16H 37/082* (2013.01); *E02B 17/0818* (2013.01)

(58) Field of Classification Search
CPC .................. F16H 37/06–37/082; F16H 48/05; F16H 48/06; F16H 2048/104; F16H 2048/106; F16H 2048/364; B60K 17/16
See application file for complete search history.

(56) References Cited

U.S. PATENT DOCUMENTS

| | | | |
|---|---|---|---|
| 4,813,814 A | 3/1989 | Shibuta et al. | |
| 5,957,804 A | 9/1999 | Schulz et al. | |
| 6,783,478 B2 | 8/2004 | Larson | |
| 7,056,252 B2* | 6/2006 | Gumpoltsberger et al. | 475/6 |
| 7,581,714 B2 | 9/2009 | Machu | |
| 8,216,108 B2* | 7/2012 | Montestruc | 475/346 |
| 2009/0090191 A1 | 4/2009 | Lenders et al. | |
| 2013/0226458 A1* | 8/2013 | Nakamura et al. | 702/3 |
| 2013/0342059 A1* | 12/2013 | Suzuki et al. | 310/83 |

FOREIGN PATENT DOCUMENTS

| | | |
|---|---|---|
| CN | 101893073 A | 11/2010 |
| DE | 102004007449 A1 | 9/2005 |
| FR | 2753466 A1 | 3/1998 |

OTHER PUBLICATIONS

International Search Report—PCT/NL2013/050593—Mailing date: Sep. 23, 2013.
Jan. 21, 2016—Written Opinion and Search Report for Singapore Application 11201501003W.

* cited by examiner

*Primary Examiner* — Huan Le
(74) *Attorney, Agent, or Firm* — Banner & Witcoff, Ltd.

(57) ABSTRACT

The drive system comprises a drive unit. The drive unit comprises a motor unit and a gear train coupled to the motor unit. The gear train comprises a differential planetary gear system having a single input shaft connected to the motor unit. The differential planetary gear system further has at least two output shafts of which each output shaft is arranged for driving a drive shaft. The differential planetary gear system comprises at least two single planetary gear sets.

19 Claims, 23 Drawing Sheets

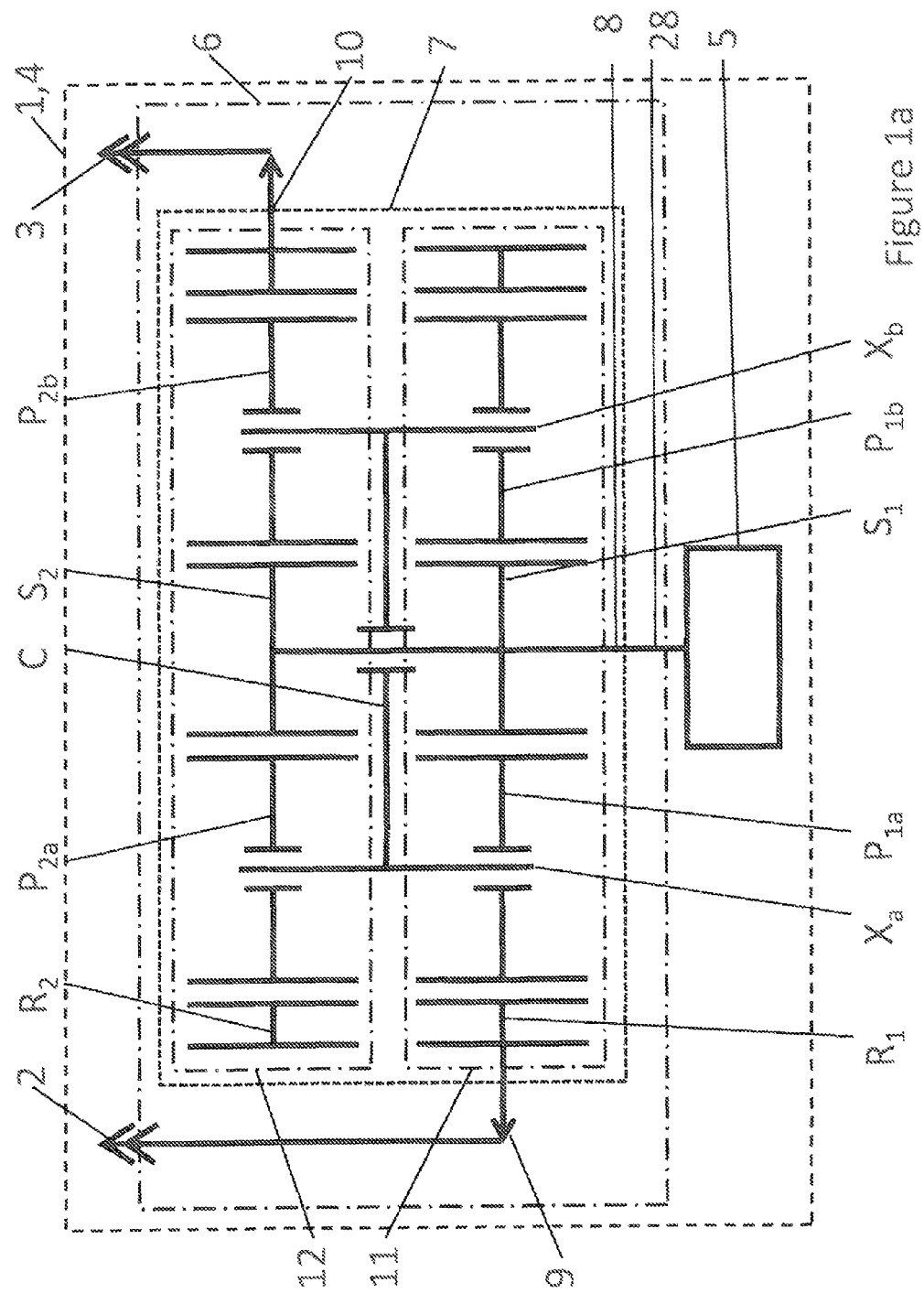

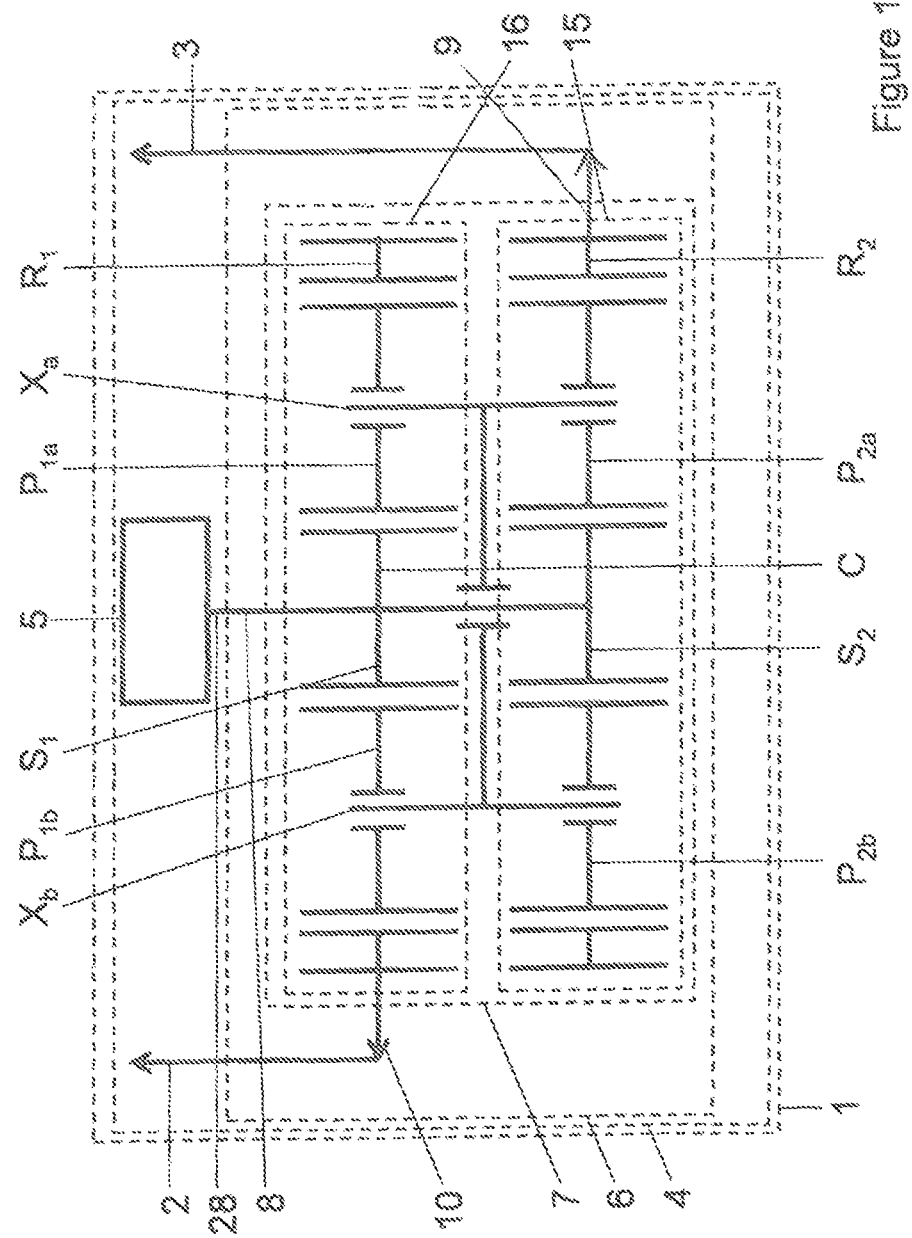

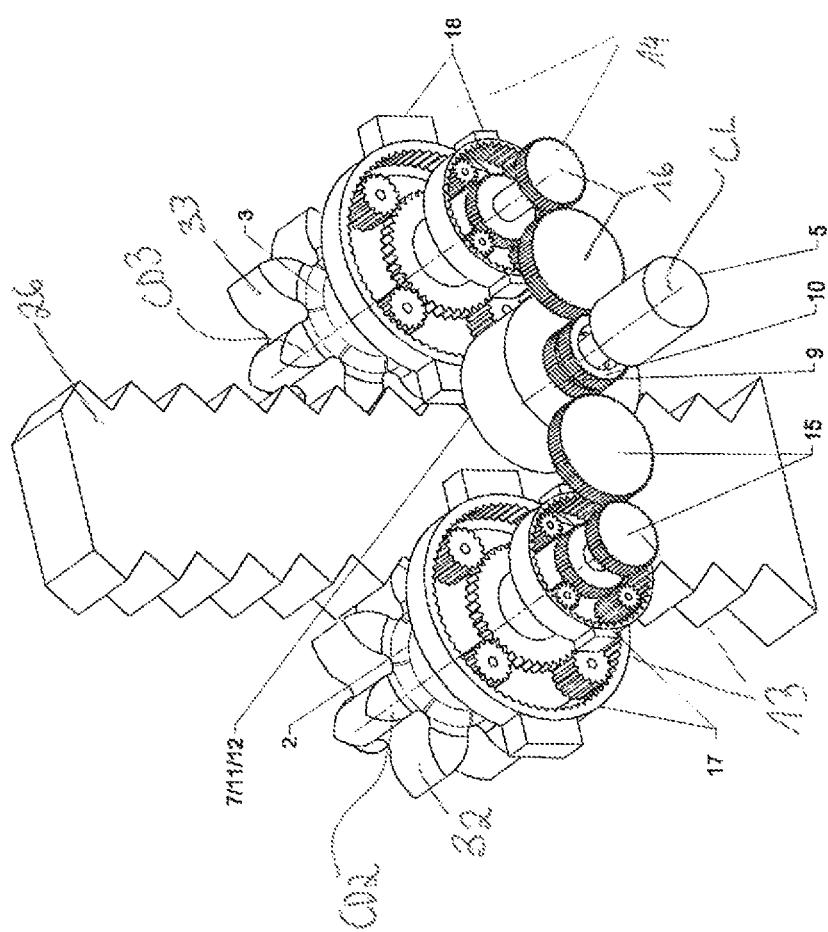

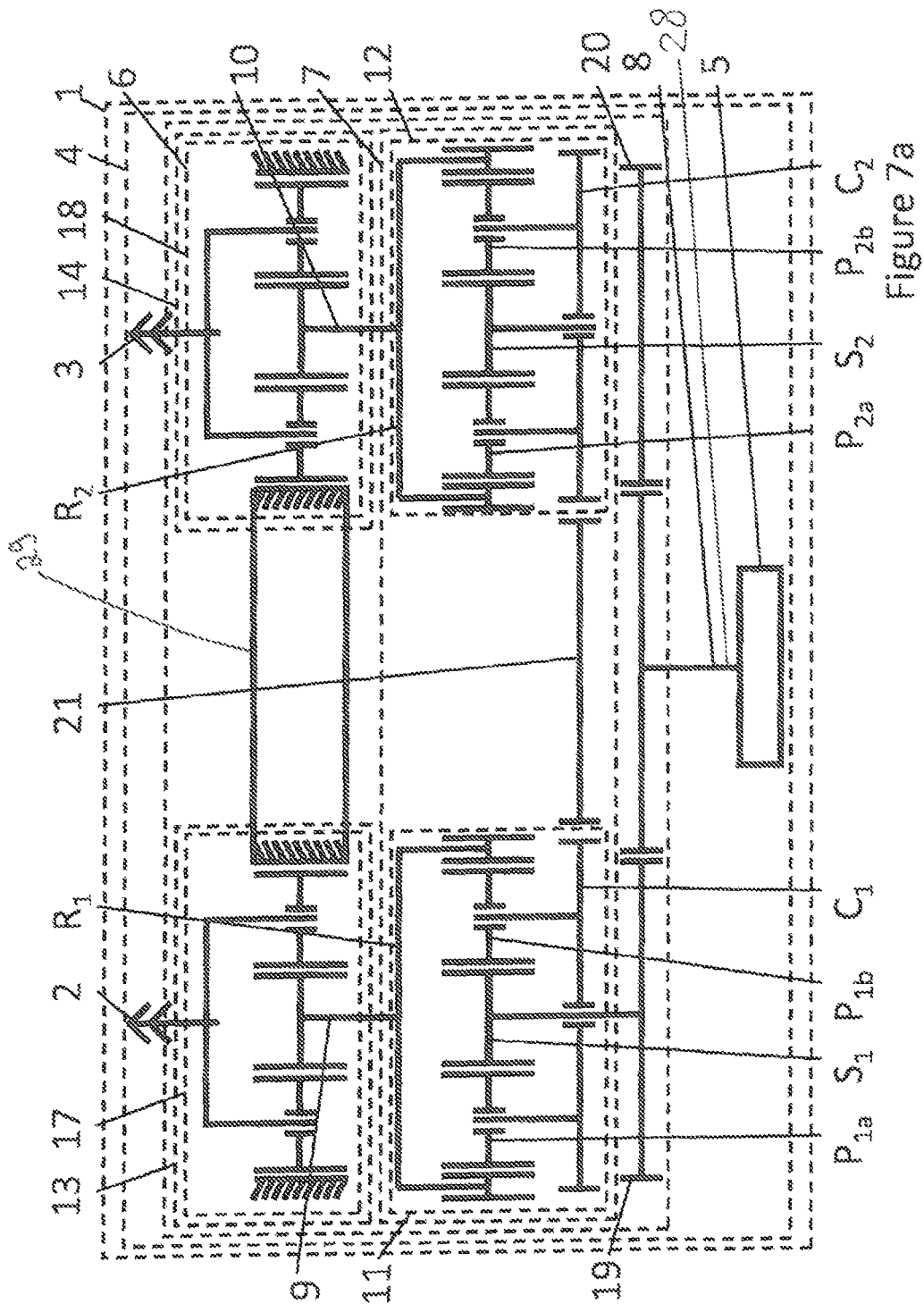

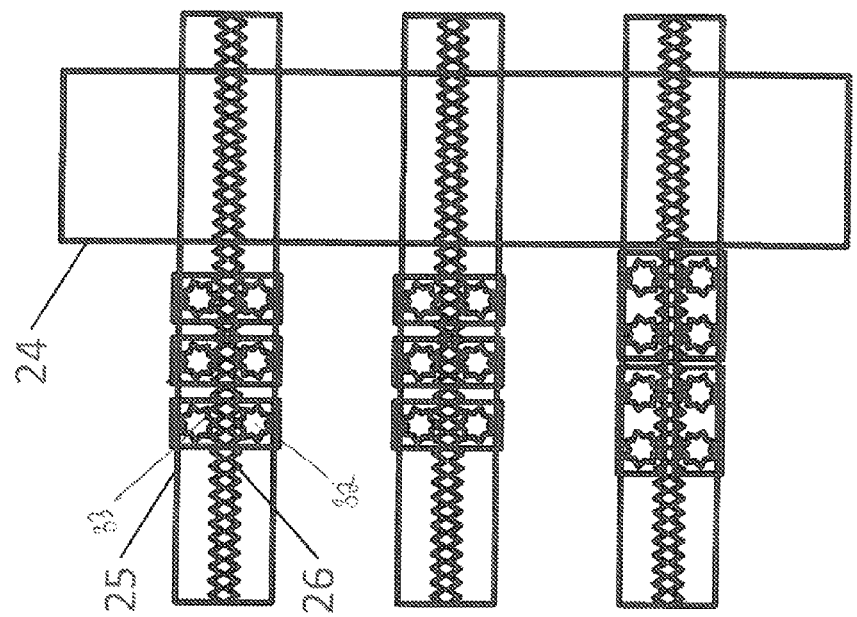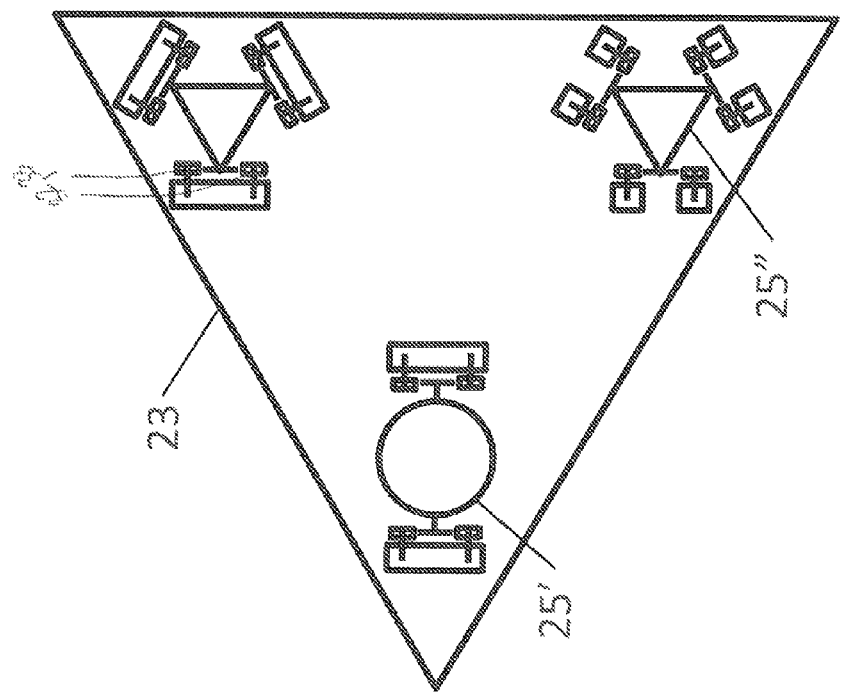

DRIVE APPARATUS OR SYSTEM

CROSS-REFERENCE TO RELATED APPLICATIONS

This application is a continuation-in-part of International Application PCT/NL2013/050593, filed Aug. 12, 2013, which claims priority to Application NL 2009315, filed Aug. 10, 2012. Benefit of the filing date of each of these prior applications is hereby claimed.

FIELD OF THE INVENTION

One or more embodiments may relate to a drive apparatus or system, and in exemplary embodiments may drive one or more two drive shafts (e.g., two drive shafts) simultaneously and/or may relate to a system or structure or vessel disposed off-shore.

DESCRIPTION OF RELATED ART

In exemplary offshore structures, where high reduction ratios are utilized, the weight of an individual gear box can become relatively high. For example, for a jack-up offshore structure having a jackable platform and a jacking system comprising gear boxes, the jacking system may take up to 8% of the total empty weight of the platform. In addition, multiple components may increase installation and/or maintenance costs and may lead to shorter maintenance intervals.

SUMMARY OF THE INVENTION

Some embodiments may provide for an improved drive unit obviating at least one of the above mentioned drawbacks. Additional embodiments may provide for a drive unit that achieves weight reduction and/or component reduction and/or may provide for easier installation.

Still further embodiments may provide for a drive unit for driving at least two drive shafts, wherein the drive unit comprises a motor unit and a gear train coupled to the motor unit, wherein the gear train comprises a compound differential planetary gear system having at least one input shaft coupled to the motor unit and at least two output shafts of which each output shaft is arranged for driving a drive shaft, wherein the compound differential planetary gear system comprises at least two planetary gear sets with different form factors that are coupled to each other to create a compound planetary gear setup, of which each planetary gear set is provided with an output shaft for driving a drive shaft to create the compound differential planetary gear setup.

In some embodiments, by providing a compound differential planetary gear system, in an efficient way a high reduction ratio may be obtained as well as it is enabled that two drive shafts can be driven simultaneously at mutually varying speed. In these embodiments, a compound differential planetary gear system can achieve a higher reduction ratio with substantially the same, or about the same, or the same number of components compared to using a series of sequentially linked planetary gear sets, making the compound planetary gear system a highly compact transmission system. Since fewer components may be possible, a weight reduction may be obtained in these examples.

In an embodiment, the gear systems may be mounted in one or more enclosed housings, so easier installation may be achieved. In the context of some examples in this disclosure, a gear set comprises a single reduction stage, such as a single stage spur- or a single planetary gear transmission. In some exemplary embodiments, a gear system may comprise one or more gear sets, and a gear train may comprise one or more gear systems.

Compound planetary gear systems may be known in various embodiments, for example with meshed planets, stepped planets or with two or more planetary gear sets. In some embodiments, the compound planetary gear system may comprise at least two single planetary gear sets that are coupled to each other via two gear shafts. A planetary gear set may, in exemplary embodiments, comprise a sun gear, one or more planet gears, a carrier and a ring gear. Each planetary gear set may be variously configured such as having an input and an output. For example, the sun gear may be the input and the carrier or the ring can be the output.

When linking two planetary gear sets, in some embodiments, the output of one planetary gear set can provide for the input of the subsequent planetary gear set. In some examples, the planetary gear sets may be linked sequentially to provide for a sequential planetary gear system. Contrary to the sequential planetary gear system, in some embodiments using a compound planetary gear system, two gear shafts may be coupled to each other. For example, in these embodiments, two planetary gear sets can be coupled to each other to create a compound planetary gear setup by coupling the shafts of their sun gears and the shafts of their ring gears to obtain a structure such as a compound planetary gear system. Or, in another example, two planetary gear sets can be coupled to each other to create another example of a compound planetary gear setup by coupling the shafts of their sun gears and the shafts of their carriers to obtain a compound planetary gear system. In still further embodiments, planetary gear sets can be coupled to each other to create a compound planetary gear setup by coupling two of the gear shafts.

Additionally or alternatively, the compound planetary gear system can be provided in a differential mode by using two of the remaining non-coupled gear shafts as output shafts. By providing the compound planetary gear system with two output shafts, in still further embodiments, a compound differential planetary gear system can be obtained with one common input shaft.

The compound planetary gear system can be used as a differential planetary gear system, which, in an embodiment, may be obtained by using those shafts that are not coupled as output shafts. For example, when the shafts of the carriers and the shafts of the sun gears are coupled, the ring gears can be used as output shafts of the compound differential planetary gear system. For example, when the ring gears and sun gears are coupled, the carriers can be used as output shafts to obtain the differential function of the gear system.

Many variants are possible for a compound planetary gear system, and particularly in terms of how the planetary gear sets may be coupled. For example, the shafts of the planet gears of the at least two planetary gear sets can be coupled and the shafts of the sun gears can be coupled, while as output shafts the ring gears can be used. Or, for example, the shafts of the carriers can be coupled and the shafts of the sun gears can be coupled, while the ring gears can be used as output shafts. Or, for example, when the planet gears of the two planetary gear sets are coupled to the same carrier and are rotationally coupled to their respective rotation shafts, one sun gear may be omitted from the compound planetary gear system (e.g., a sun gear may be absent from a planetary gear set that is coupled to another). Thus, in these examples, fewer components may be used, which may render the gear train more cost effective and/or easier to build and/or easier to assemble.

In examples providing differential functionality in the drive unit, the drive unit may be able to compensate for variations in torque and/or rotational speed between the at least two drive shafts, such that two drive shafts can be driven simultaneously at mutually varying speed. For example, in case the drive shafts are coupled to respective pinions that engage respective racks, the torque between the pinions can vary. For instance, due to wear and tear of the pinion and/or the rack, contact profiles between pinions and their respective racks may vary. Therefore, the drive system in this case may be able to alter the individual output speed of each pinion, according to the reaction torque.

A planetary gear set in certain embodiments may have one input axis, e.g., the sun gear, and two output axes, e.g., the ring gear and the carrier, of which one may be fixed and one may be free. In an embodiment of a sequential planetary gear system each planetary gear set may have one input, e.g., the sun gear, and one output, e.g., the carrier and/or the ring. The sequential planetary gear system may be created by linking the output of each planetary gear set to the input of a subsequent planetary gear set.

In still further embodiments, by providing a compound differential planetary gear system for driving two drive shafts simultaneously, the drive shafts may be configured to counter-rotate with respect to each other, thereby compensating, or substantially compensating, for each other's reaction torque. Alternatively and/or additionally, in other embodiments, a reaction-torque compensation may be provided. For embodiments with a sequentially linked planetary gear system driving one output shaft, a reaction-torque compensation may be optionally provided. Such reaction-torque compensation may be achieved in various embodiments in the form of a connection to the surrounding structure, or otherwise by providing a common housing for the two counter-rotating output shafts, in which case this connection to the surrounding structure may be obviated.

In embodiments where coupled planetary gear sets of the compound differential planetary gear system are different, a higher reduction ratio may be obtained than with a sequential planetary system. For example, different planetary gear sets can be obtained by a difference between the ratios of the number of sun gear teeth over the number of planet gear teeth of the respective planetary gear sets. In still further embodiments, the ratio of the number of sun gear teeth versus the number of planet gear teeth can be defined as the form factor.

As an example, the number of teeth on the planet gears of the first planetary gear set might be 27 and the number of teeth on the sun gear of the first planetary gear set might be 25, resulting in a first planetary gear set form factor of 0.926(=25/27) and a transmission ratio of 1:4.16 when the ring gear would be fixed, the sun gear used as input shaft, and the carrier as output shaft. In another example, the number of teeth on the planet gears of the second planetary gear set might be 30 and the number of teeth on the sun gear of the second planetary gear set might be 22, resulting in a second planetary gear set form factor of 0.733(=22/30) and a transmission ratio of 1:4.73 when the ring gear would be fixed, the sun gear used as input shaft, and the carrier as output shaft. In such embodiments, when the previously mentioned planetary gear sets would be coupled in a sequential set-up the overall ratio would be 1:19.7. In such embodiments, when the previously mentioned planetary gear sets would be coupled in a compound differential set-up the overall transmission ratio would be 1:53.7. These examples are only given by way of elaboration on the higher transmission ratio due to a difference in form factor between the planetary gear sets. The examples are by no means limiting or restricting the scope of the claims.

According to embodiments, the form factors of the planetary gear sets may be different. For example, the difference may be generally between about 1.5% and about 50%, typically between 3% and 40%, and often between 10% and 35%.

In typical examples, as output shafts of the compound differential planetary gear system, the ring gears or the carriers of the planet gears can be used. The respective output shafts may then be coupled further to the drive shafts.

In additional embodiments, between each output shaft and the drive shaft being driven by the output shaft, a final gear system may be arranged. In these embodiments, a gear system may comprise one or more gear sets. For example, these final gear systems can comprise a transverse gear system, comprising a number of transverse gear sets, and/or a final planetary gear system, comprising one or more final planetary gear sets, of which the output of each final planetary gear set may be coupled to a drive shaft.

Advantageously, in certain embodiments, the motor unit and/or an output shaft of the motor unit can be positioned centrally or substantially centrally in the drive unit. For example, the motor unit can be positioned between the two drive shafts and/or an output shaft of the motor unit can be aside or aligned with the input shaft of the compound differential planetary gear system. In these examples, by positioning the motor unit centrally or substantially centrally with respect to the drive unit, the drive unit can be relatively compact and/or a weight reduction may be achieved. Alternatively, in other examples, the motor unit can be positioned eccentrically with respect to the drive unit, e.g., aside the drive unit and/or outside of a gear train housing.

Advantageously in other examples, an output shaft of the motor unit can be positioned aside the input shaft of the compound differential planetary gear system, e.g., alongside of, above, or beneath, the input shaft, and in some examples, preferably parallel to, substantially parallel to, or about parallel to, the input shaft. Additionally and/or alternatively, the shafts may be coupled by means of one or more gear sets, gears and/or other means such as a chain or a belt.

Alternatively or additionally, in other examples, the motor unit can be placed in line with an input shaft of the compound differential planetary gear system. In an embodiment, the motor unit can have an output shaft that is aligned with, or substantially aligned with, the at least one input shaft of the compound differential planetary gear system. For example, the output shaft of the motor unit and the input shaft of the compound differential planetary gear system, which can be placed concentric with respect to each other, may be coupled in order to act as one shaft or the two shafts may be integrated in order to form a single shaft or act as a single shaft, at least in one rotational direction thereof.

Additionally or alternatively, in still further examples the motor unit may be placed at least partly, for example, completely or substantially completely, between the at least two output shafts of the compound differential planetary gear system and/or at least partly, or substantially or about completely, between the two drive shafts, for example in the case of two drive shafts coupled to two pinions engaging two opposing racks. The motor unit may be placed at least partly, for example completely or substantially completely, between two pinions coupled to the two drive shafts and/or at least partly, for example completely or substantially completely, between two racks arranged alongside each other and engaged by the two pinions.

In additional examples, the output shaft of the motor unit may comprise a centreline and the drive shafts may comprise centrelines. According to an embodiment, the centreline of the output shaft may be positioned in between the drive axes, for example symmetrically between the centrelines of the drive shafts. In a direction as seen along the centreline of the output shaft, in these embodiments, the motor unit may be positioned in front of, and/or partially overlapping with, the drive shafts.

In exemplary embodiments, by providing the motor unit in such a central position the drive unit can be relatively compact and/or the weight of the drive unit may be relatively low.

Furthermore, in certain embodiments, the motor unit may be provided with a cooling unit. However, the cooling unit may alternatively be omitted or may be relatively small. In case the cooling unit is omitted or is relatively small, the motor unit can be relatively small, which may facilitate a central placement thereof.

Moreover, in still further embodiments, the motor unit of a drive unit may be placed between two final planetary gear systems as mentioned above.

Further, in other embodiments, an output shaft of the motor unit and/or an input shaft of the compound differential planetary gear system may extend at least partly through a coupling which couples the ring gears of the final planetary gear sets.

Further, in additional embodiments, the drive unit may comprise a coupling unit arranged for coupling the output shaft of the motor unit to at least one input shaft of the compound differential planetary gear system.

Advantageously, in certain embodiments, the gear systems of the drive unit may be arranged in one or more enclosed housings. In these embodiments, by arranging the gear systems in enclosed housings, the drive unit can be manufactured and assembled off site, e.g., in a factory, and may then be transported to the construction yard to be installed onto the final structure, e.g., an offshore jack-up structure. In embodiments providing a housing for the relatively compact gear train, the gear train may be handled as a plug-and-play component that may reduce installation complexity, risk and time, but also may reduce maintenance costs and may further reduce operational costs of, for example, the offshore structure on which it is mounted. Alternatively and/or additionally, in certain embodiments, the gear systems of the drive unit may be provided in individual (e.g., separate) housings. For example, the drive unit in such a case may be assembled on the offshore structure by installing the individual gear system housings onto the structure.

Advantageously, the housing and/or the gear system housings in other embodiments may be provided with connecting elements, such as bolts, clamping fingers, pins etc. In these embodiments, there may be first connecting elements for connection to a motor unit and there may be second connecting elements for connection to the drive shafts, such that the housing and/or housings may be relatively easily assembled. Many variants of connecting elements may be used.

In an embodiment, the gear train may be symmetrically arranged between the centrelines of the drive shafts.

In an embodiment, the drive system may comprise an integrated load measuring system, which allows determination of the torque transmitted through the drive system.

Further embodiments relate to methods comprising using a motor unit to drive at least two drive shafts through a gear train comprising a compound differential planetary gear systems, optionally including any of the features as described herein, with two planetary gear sets, optionally including any of the features as described herein, respectively driving two output shafts. According to particular embodiments, the planetary gear sets are coupled to each other, as described herein.

Yet further embodiments relate to compound differential planetary gear systems having last least one input shaft configured for coupling to a motor unit and at least two output shafts configured to drive corresponding, respective drive shafts, wherein such systems comprise at least two planetary gear sets that are coupled to each other as described herein.

Still further embodiments are directed to offshore structures, and especially offshore jackable structures, that are configured to be jacked (e.g., by driving pinions that are engaged with racks provided in legs of the structures), using the drive units and compound differential planetary gear systems as described herein. Other embodiments relate to the methods for jacking offshore jackable structures, comprising driving pinions that are engaged with racks provided in legs of the structures, using the drive units as described herein.

Further advantageous embodiments are represented in the specification herein, as well as in independent and dependent claims appended hereto.

Embodiments may therefore relate to a drive system, a gear box, and/or to an offshore structure. These and other embodiments will become apparent.

These and other aspects and embodiments associated with the present invention are apparent from the following Detailed Description

BRIEF DESCRIPTION OF THE DRAWINGS

Various embodiments will further be elucidated on the basis of exemplary embodiments which are represented in the drawings and accompanying descriptions. The exemplary embodiments are given by way of non-limitative illustrations.

In the drawings:

FIG. 1a shows a schematic view of a first embodiment of a drive system;

FIG. 1b shows a schematic perspective view of an embodiment according to FIG. 1a;

FIG. 1c shows a schematic view of an alternative to FIG. 1a, with the motor unit positioned differently;

FIG. 2b shows a schematic perspective view of an embodiment according to FIG. 2a;

FIG. 3b shows a schematic perspective view of an embodiment according to FIG. 3a;

FIG. 4b shows a schematic perspective view of an embodiment according to FIG. 4a;

FIG. 5b shows a schematic perspective view of an embodiment according to FIG. 5a;

FIG. 6b shows a schematic perspective view of an embodiment according to FIG. 6a;

FIG. 7a shows a schematic view of a seventh embodiment of a drive system;

FIG. 7b shows a schematic perspective view of an embodiment according to FIG. 7a;

FIG. 9a shows a schematic top view of a jack-up offshore structure comprising drive systems, here shown for different kinds of configurations; and FIG. 9b shows a schematic side view of the jack-up offshore structure of FIG. 9a;

Figure 1B:
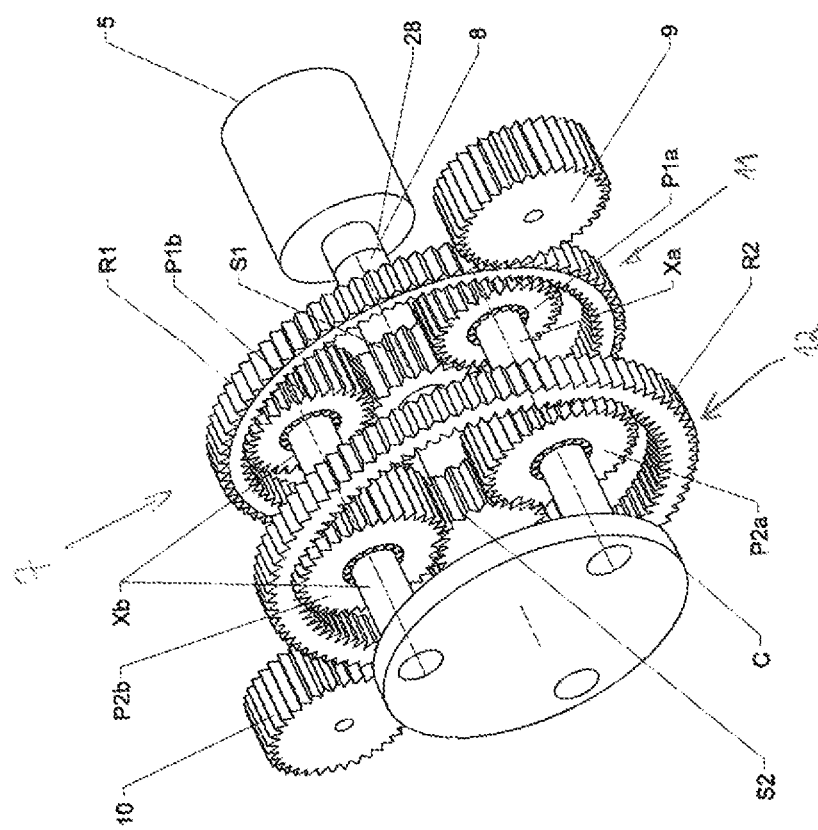

It is noted that the figures are only schematic representations of embodiments that are given by way of non-limiting examples. In the figures, the same or corresponding parts are designated with the same reference numerals. For the purpose of clarity and a concise description features are described herein as part of the same or separate embodiments; however, it will be appreciated that embodiments having combinations of all or some of the features described are specifically contemplated by the inventor.

FIGS. 1-11b are to be understood to present an illustration of the invention and/or principles involved. To aid in understanding the invention, the features shown in FIGS. 1-11b are not necessarily drawn to scale, and some features not essential to this understanding are not shown. As is readily apparent to one of skill in the art having knowledge of the present disclosure, various other embodiments of the invention include drive systems and their associated components (e.g., compound differential planetary gear systems), having configurations and elements determined, in part, by their specific use.

DETAILED DESCRIPTION

FIG. 1a and FIG. 1b show a first exemplary embodiment of a drive system 1. The drive system 1 may be arranged for driving multiple drive shafts simultaneously.

In this embodiment, the drive system 1 may comprise multiple drive units 4. In this figure, for simplicity's sake, only one drive unit 4 is shown. The drive unit 4 in this example may be arranged for driving at least two drive shafts. In this embodiment, there are two drive shafts, a first drive shaft 2 and a second drive shaft 3. The drive unit 4 of the present embodiment comprises a motor unit 5 which drives a gear train 6.

In this embodiment, the gear train 6 comprises a compound differential planetary gear system 7. The compound differential planetary gear system 7 may be variously configured such as having a single input shaft 8 that is connected to the motor unit 5. For example, an output shaft 28 of the motor unit 5 may be coupled to the input shaft 8. The motor unit 5 may be positioned in front of the gear system 7, as for example in FIG. 1a or FIG. 1b, or may be positioned behind the gear system 7, as for example in FIG. 1c.

In this embodiment, the compound differential planetary gear system 7 may have at least two output shafts of which each output shaft is arranged for driving one of the drive shafts 2, 3. In other embodiments, there may be as many output shafts provided as there are drive shafts. For example, there may be a first output shaft 9 arranged for coupling with the first drive shaft 2. There may also be a second output shaft 10 arranged for coupling with the second drive shaft 3.

In this embodiment, the compound differential planetary gear system 7 may comprise two planetary gear sets with different form factors. For example, the compound differential planetary gear system 7 may comprise two planetary gear sets 11 and 12. Each planetary gear set has, in this embodiment, a sun gear S, planet gears P, a ring R and a carrier C. The first planetary gear set 11 comprises a first sun gear S1, first planet gears P1a, P1b and a first ring R1. The second planetary gear set 12 comprises a second sun gear S2, second planet gears P2a, P2b and a second ring R2. The ratio between the sizes of the planet gears P1a/P1b and sun gear S1 is, in this example, different from the ratio between the sizes of planet gears P2a/P2b and sun gear S2.

The planet gears P1a, P1b, P2a and P2b share in the embodiment of FIG. 1a and FIG. 1b a single carrier C. The first planet gear P1a and the second planet gear P2a share the same rotation axis Xa, but may individually rotate around the rotation axis Xa. The first planet P1b and the second planet P2b share the same rotation axis Xb, but may individually rotate around the rotation axis Xb. In other embodiments, the planet gears P1a, P2a and P1b, P2b may be rotationally fixed to their rotation axes Xa, Xb respectively.

The shafts of the sun gears S1, S2 may be coupled to each other via a common input shaft 8.

By coupling the planetary gear sets 11 and 12 together, in the embodiments of FIG. 1a and FIG. 1b via coupled shafts of the planet gears P1a and P1b and coupled shafts of the sun gears S1 and S2, a compound planetary gear system 7 may be obtained, resulting in a compact gear train with a relatively high transmission ratio. In other embodiments, other shafts of the planetary gear sets may be coupled as well, such as shafts of the rings.

Figure 2A:
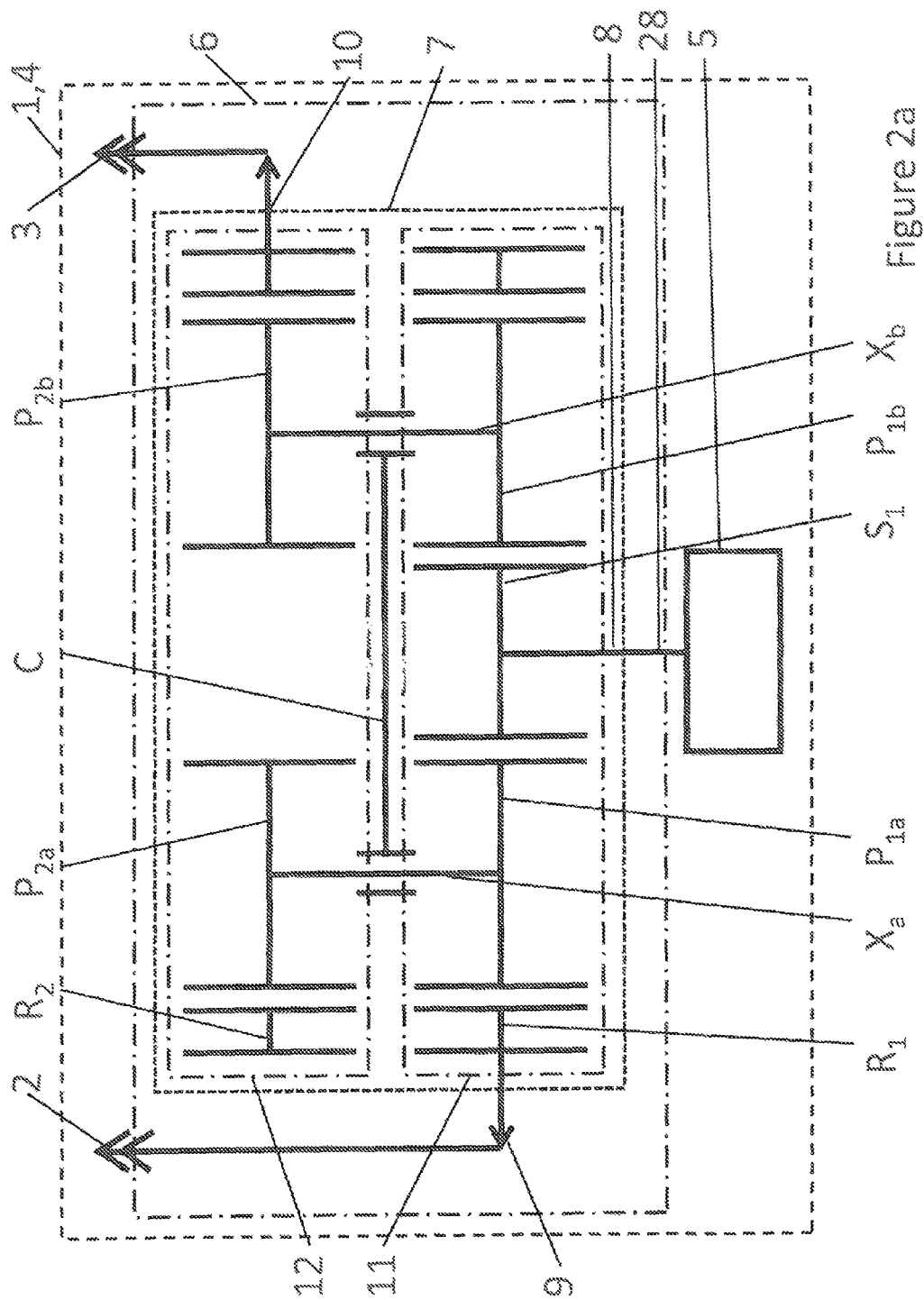
FIG. 2a shows a schematic view of a second embodiment of a drive system.
Figure 2B:
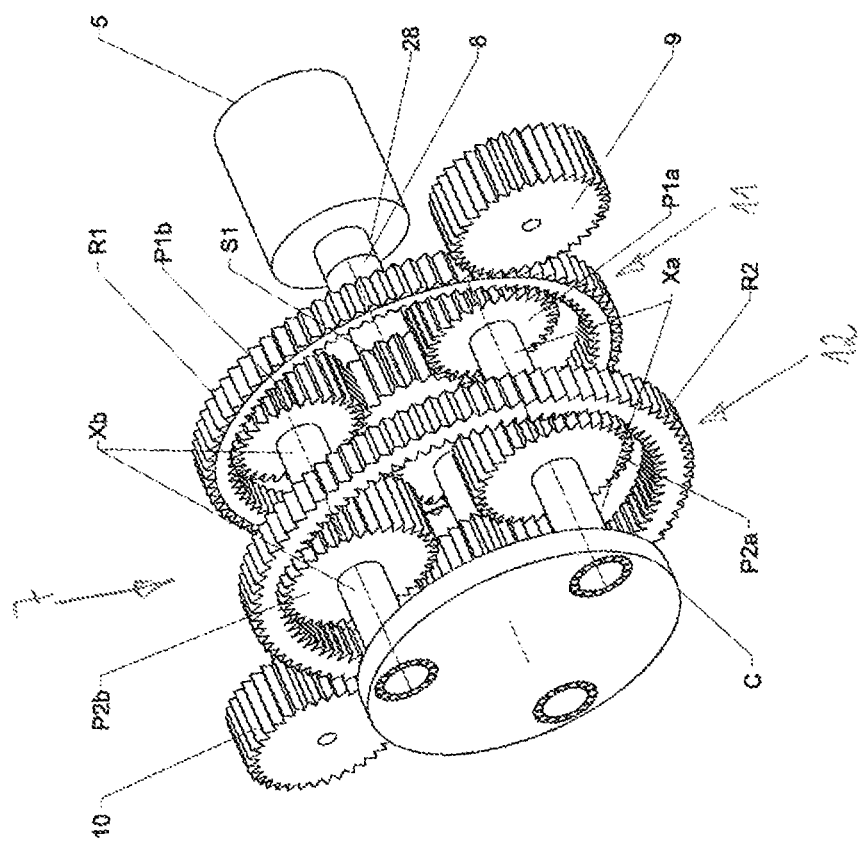

Alternatively, the sun gear S2 may be omitted, in which case the planet gears P1a and P2a may be rotationally fixed to the shaft Xa and planet gears P1b and P2b may be rotationally fixed to the shaft Xb. Such an embodiment is shown in FIG. 2a and FIG. 2b. The planet gears P1a, P2a, P1b, P2b then may have a common carrier C, and the pairs of planet wheels P1a, P2a and P1b, P2b may be rotationally fixed with respect to the respective shafts Xa and Xb. In embodiments wherein a sun gear may be omitted (e.g., absent from a planetary gear set), there may be fewer components, the installation time may be reduced, and/or a more cost effective drive system may be advantageously obtained.

Alternatively, the ring gears R1, R2 of the planetary gear sets 11, 12 may be coupled, as well as the sun gears S1, S2. This is for example shown in the embodiment of FIG. 3a and FIG. 3b. One carrier may be coupled to one output shaft 9 and another carrier may be coupled to another output shaft 10. According to the embodiment shown in FIG. 3a and FIG. 3b, the carrier C1 may be coupled to output shaft 9 and the carrier C2 may be coupled to the output shaft 10.

Figure 3A:
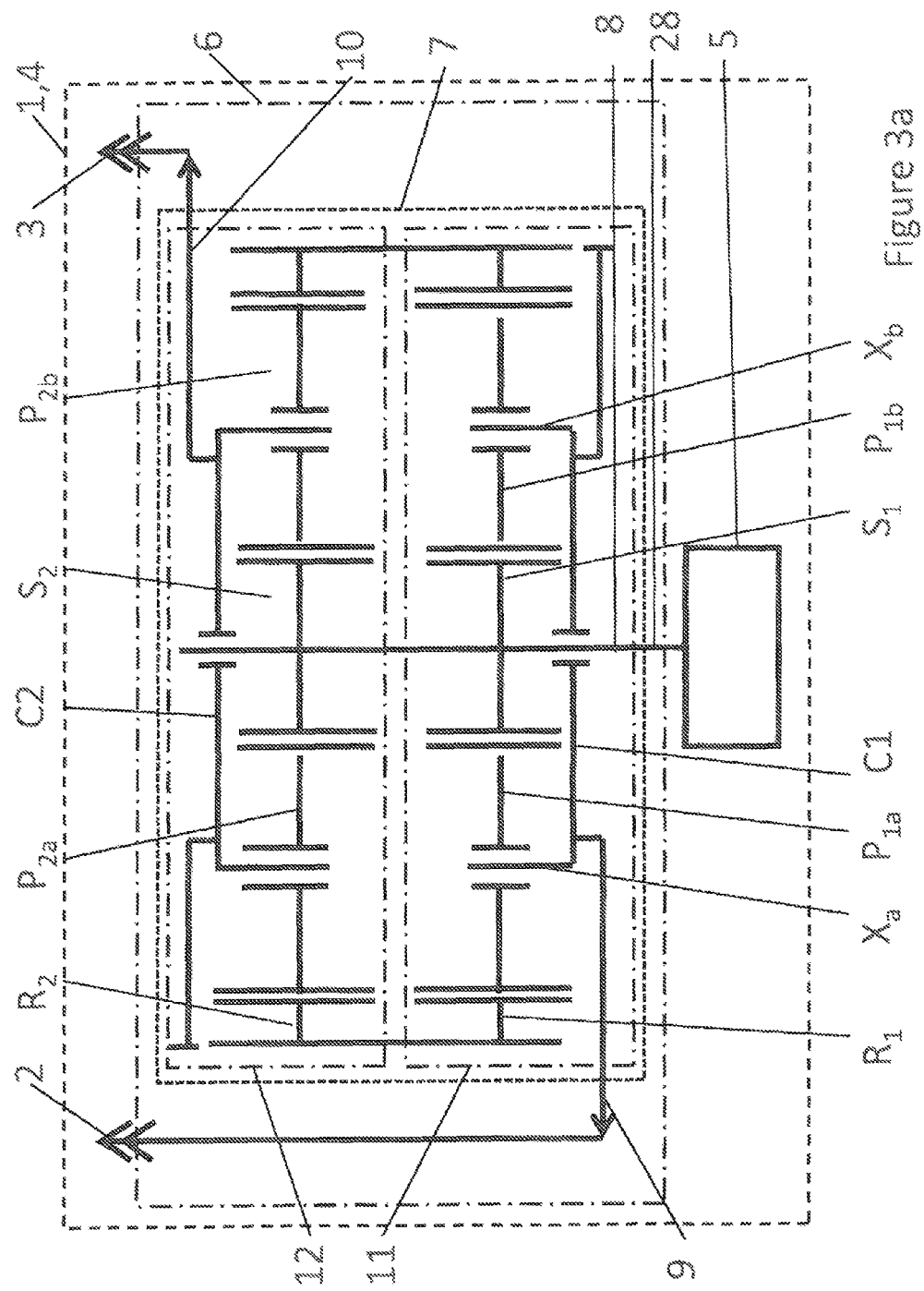
FIG. 3a shows a schematic view of a third embodiment of a drive system.
Figure 3B:
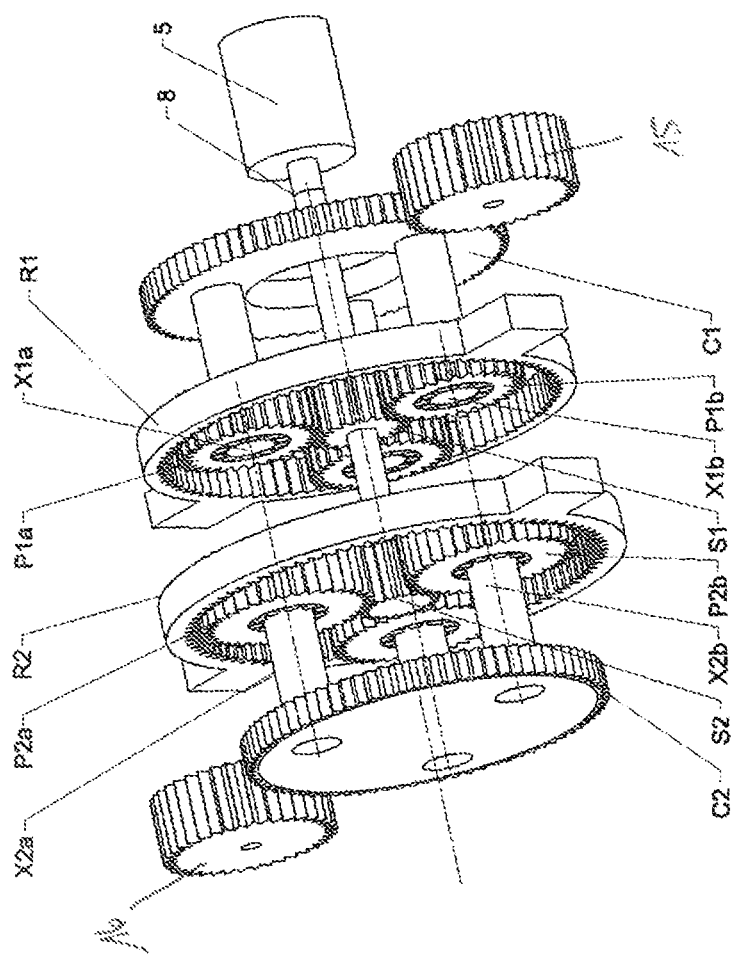

According to the embodiment of FIG. 3a, FIG. 3b, the sun gears S1, S2 may be connected to each other via the input shaft 8. The first and second planetary gear sets 11, 12 of the embodiments of FIG. 3a, FIG. 3b may have their own carriers C1 and C2. Further, the carriers C1 and C2 may, according to this embodiment, be arranged as the first and second output shafts 9, 10 respectively. The ring gears R1 and R2 may, according to this embodiment, be coupled to each other to form one ring gear R. According to this embodiment, the compound differential planetary gear system 7 may be obtained by coupling the sun gears S1 and S2 and by coupling the ring gears R1 and R2. The differential functionality may be provided by using the two carriers C1, C2 as output shafts 9, 10. Also here, the motor unit 5 may be positioned centrally between the drive shafts 2, 3 and/or may be positioned in front of the gear system 7 and/or may be positioned behind the gear system 7.

In an embodiment providing a compound differential planetary gear system 7, the drive system 1 may be able to alter the individual output speed of each drive shaft 2, 3 according to the reaction torque, in order to compensate for, or substantially compensate for, variations in torque between the drive shafts 2, 3. The compound planetary gear system 7 may have a differential functionality when there may be two output shafts 9, 10 used. In an embodiment of a non-differential compound planetary gear system, one output shaft may be free and one output shaft may be fixed. By providing an embodiment with a differential functionality, two drive shafts may be driven simultaneously at mutually varying speeds, for example when each of the drive shafts 2, 3 connects to a respective pinion engaging a respective rack. In an embodiment, the racks may be mounted on the same object, and the differential functionality may be provided for driving the pinions over their respective racks. Altering the output speed of one of the drive shafts 2, 3 may enable a load distribution between the pinions to be varied, in the case of geometric alterations and/or variations, for example variations in wear that may occur on the racks.

In an embodiment, the motor unit 5 may be placed in line with the input shaft 8 of the compound differential planetary gear system 7. The output shaft 28 of the motor unit 5 may be in line with and coupled to the input shaft 8 of the compound differential planetary gear system 7. For example, the output shaft 28 of the motor unit 5 and the input shaft 8 of the compound differential planetary gear system 7 may be placed concentrically with respect to each other and/or may be coupled to act as one shaft 8, 28. Alternatively, the two shafts 8, 28 may be integrated to form a single shaft. Alternatively, a coupling element may be positioned between the output shaft 28 and the input shaft 8 to couple the shafts to each other.

In an embodiment, the motor unit 5 may be placed between the two drive shafts 2, 3. The two drive shafts 2, 3 may be coupled to two pinions engaging two racks. Alternatively or additionally, the motor unit 5 may be placed between the at least two output shafts 9, 10 of the compound differential planetary gear system 7. In an embodiment, the motor unit 5 may be placed between two pinions coupled to the two drive shafts and/or between two racks arranged alongside each other, which may be engaged by the two pinions. Pinions 32, 33 and/or rack 26 are for example shown in FIG. 4b, 5b, 6b, 7b or 8b. For example, the output shaft 28 may have a centreline CL, and/or the drive shafts 2, 3 may have centrelines CD2, CD3. In an embodiment, the centreline CL of the output shaft 28 may be positioned between the centerlines CD2, CD3 of the drive shafts 2, 3, as for example shown in FIG. 4b. The centreline CL may be symmetrically positioned between the centrelines CD2, CD3. The three centrelines CL, CD2, CD3 may be in the same plane, or substantially the same plane, or centreline CL may be positioned above or below the plane of centrelines CD2, CD3. As seen in a direction along the centreline CL, the motor unit 5 may be positioned in front of the gear system 7, as for example shown in FIG. 4b, or may be positioned behind the gear system 7, as for example shown in FIG. 5b or in FIG. 1c. In such an embodiment, the position of the motor unit 5 may provide for additional compactness of the drive system.

Figure 4A:
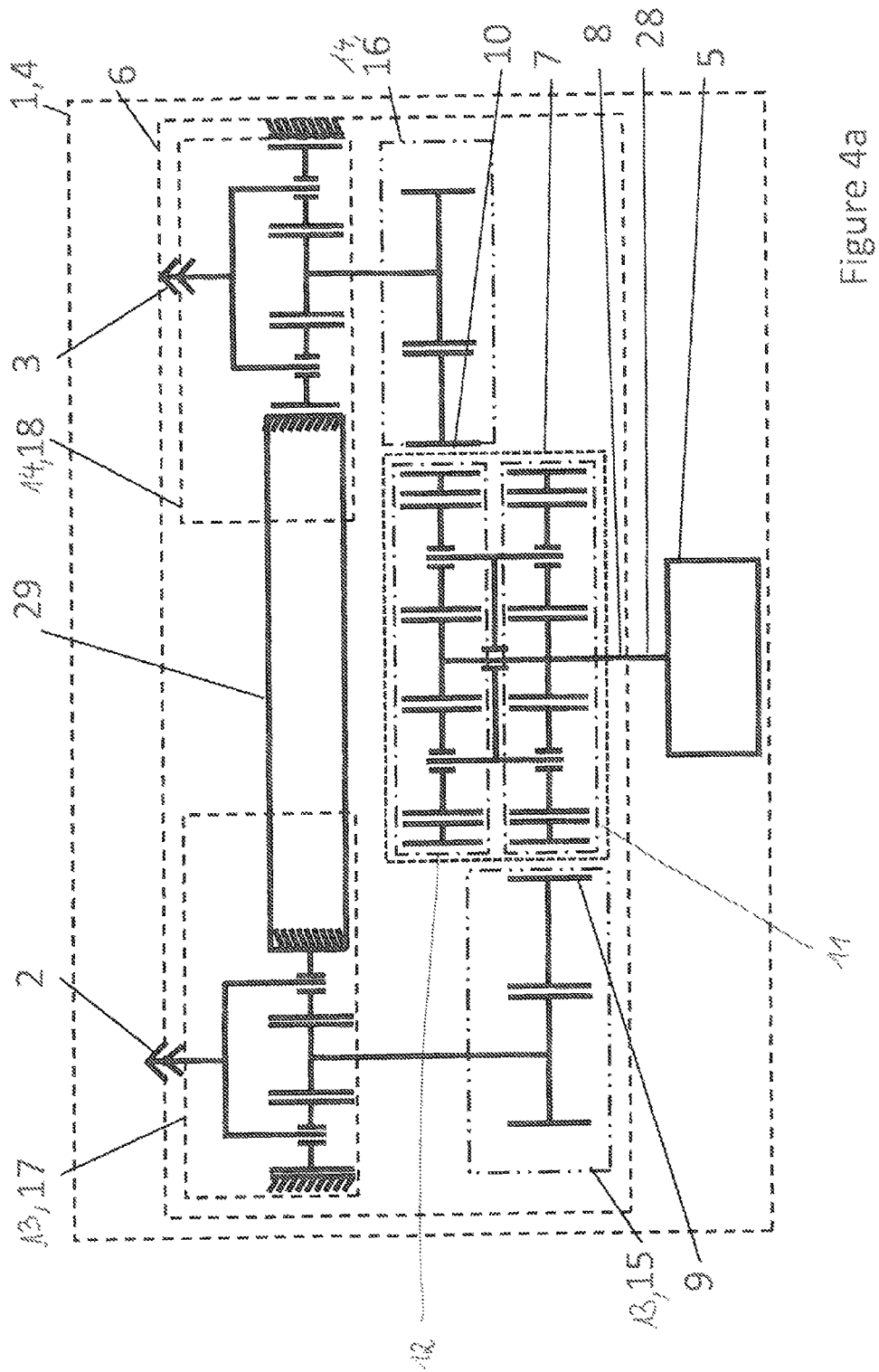
FIG. 4a shows a schematic view of a fourth embodiment of a drive system.

In an embodiment, a final gear system 13, 14 may be positioned between the output shafts 9, 10 of the compound differential planetary gear system 7 and the drive shafts 2, 3 respectively. The final gear system 13, 14 may comprise in this embodiment, for example as shown in FIG. 4a and FIG. 4b, a transverse gear system 15, 16 and a final planetary gear system 17, 18 respectively. Alternatively, the final gear system 13, 14 may comprise a transverse gear system 15, 16, or may comprise a final planetary gear system 17, 18. The transverse gear system 15, 16 may be, in the embodiment of FIG. 4a and FIG. 4b, a spur gear. Also, FIG. 5a, FIG. 5b, FIG. 6a, FIG. 6b, FIG. 7a and FIG. 7b show an embodiment of a final gear system 13, 14.

Figure 4C:
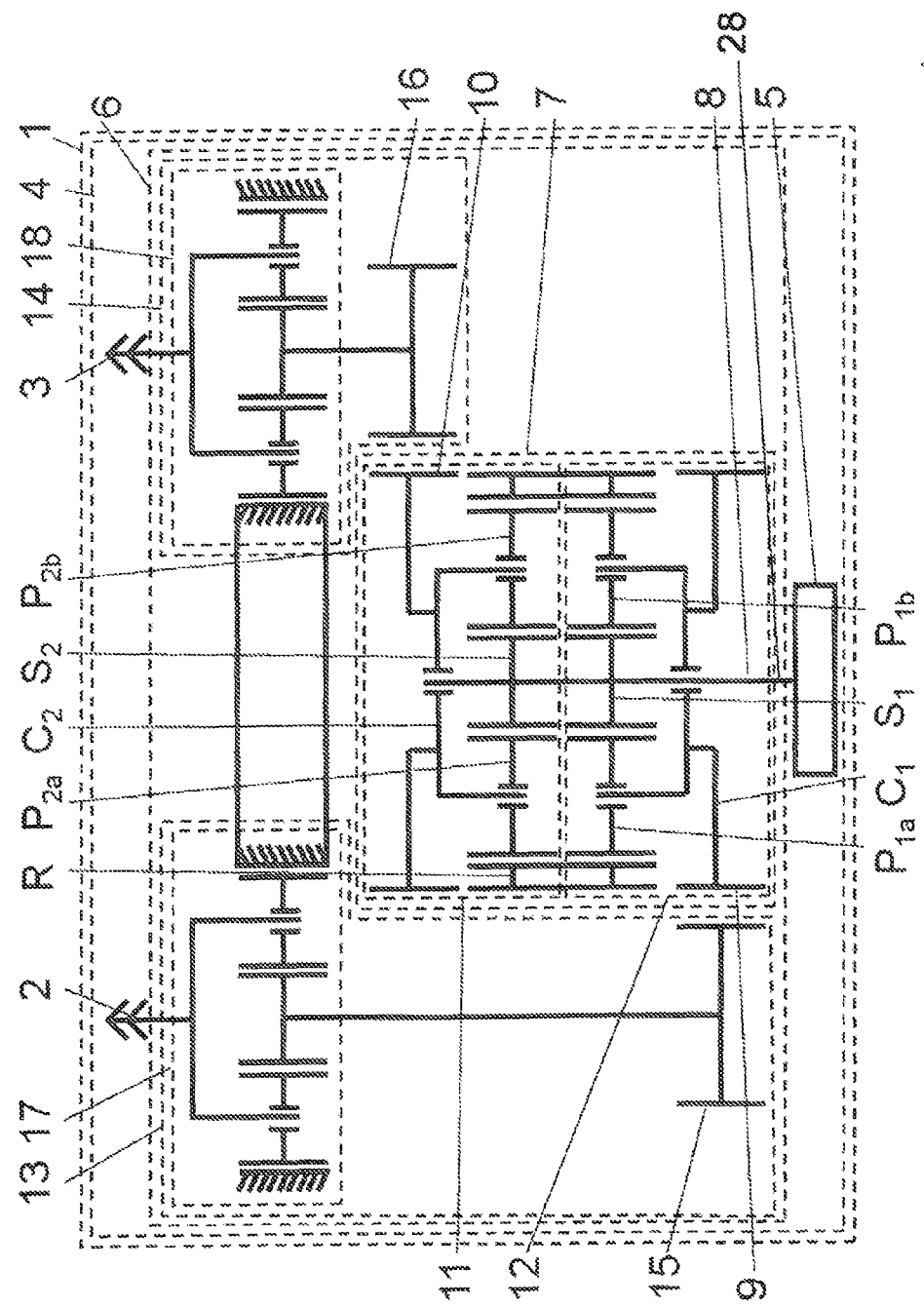
FIG. 4c shows a schematic view of an embodiment of FIG. 4a with a different configuration of the gear system 7.

FIG. 4c shows an embodiment similar to the embodiment of FIG. 4a, but having a different configuration of the gear system 7. According to the embodiment of FIG. 4c, the carriers C1 and C2 may be connected to the output shafts 9, 10. The sun gears S1 and S2 may be coupled to each other, and the ring gears R1 and R2 may be coupled to a single ring gear R. Many variants of the gear system 7 may be used.

In an embodiment, the first output shaft 9 may be coupled to the first drive shaft 2 via a first transverse gear system 15 and a final planetary gear system 17. The second output shaft 10 may be coupled to the second drive shaft 3 via a second transverse gear system 16 and a second final planetary gear system 18. In an embodiment, the ring gears of the final planetary gear system 17 and 18 may alternatively be coupled together through a coupling unit 29, to obtain a gear train free, or substantially free, from reaction torque.

Figure 5A:
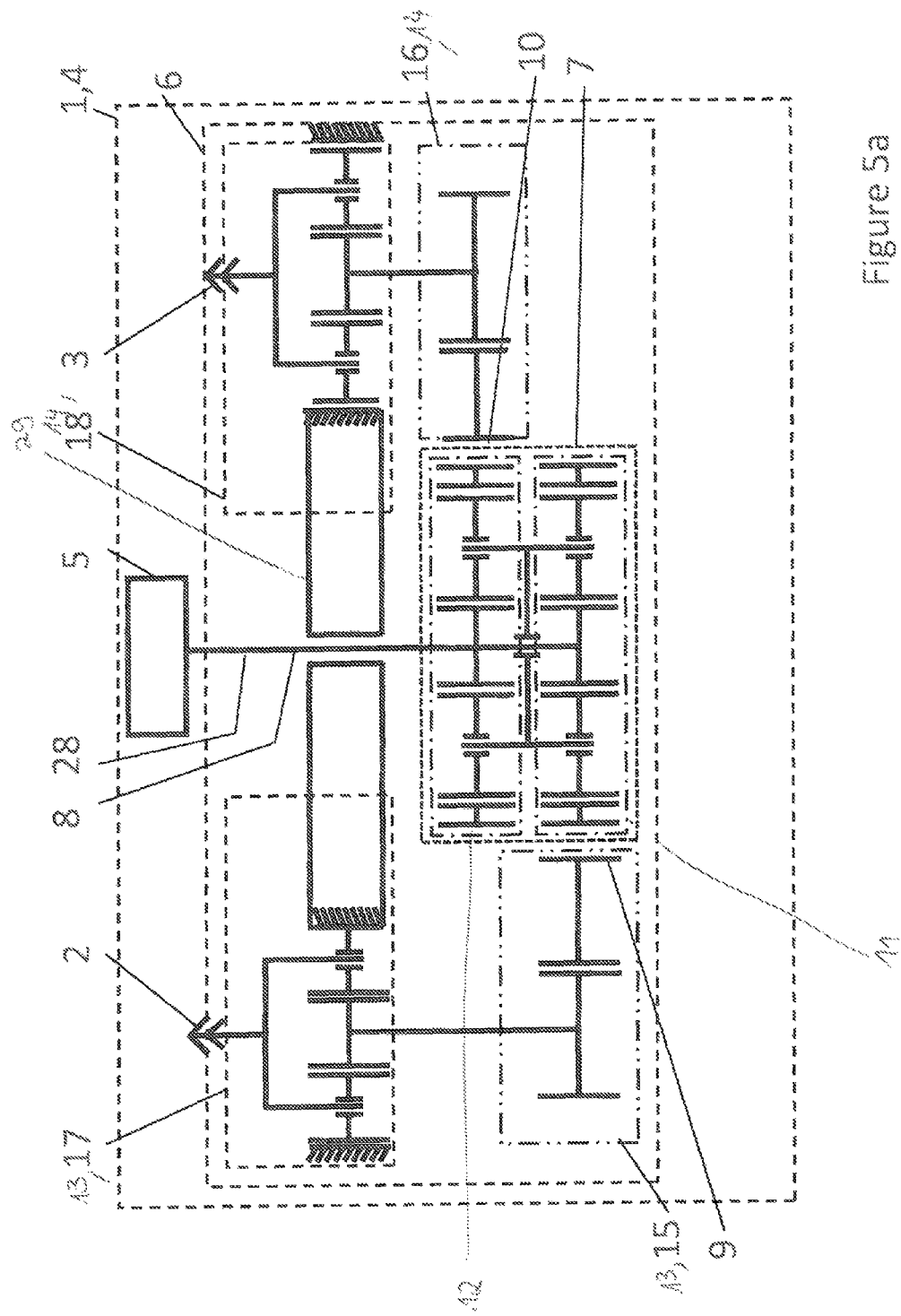
FIG. 5a shows a schematic view of a fifth embodiment of a drive system.
Figure 5B:
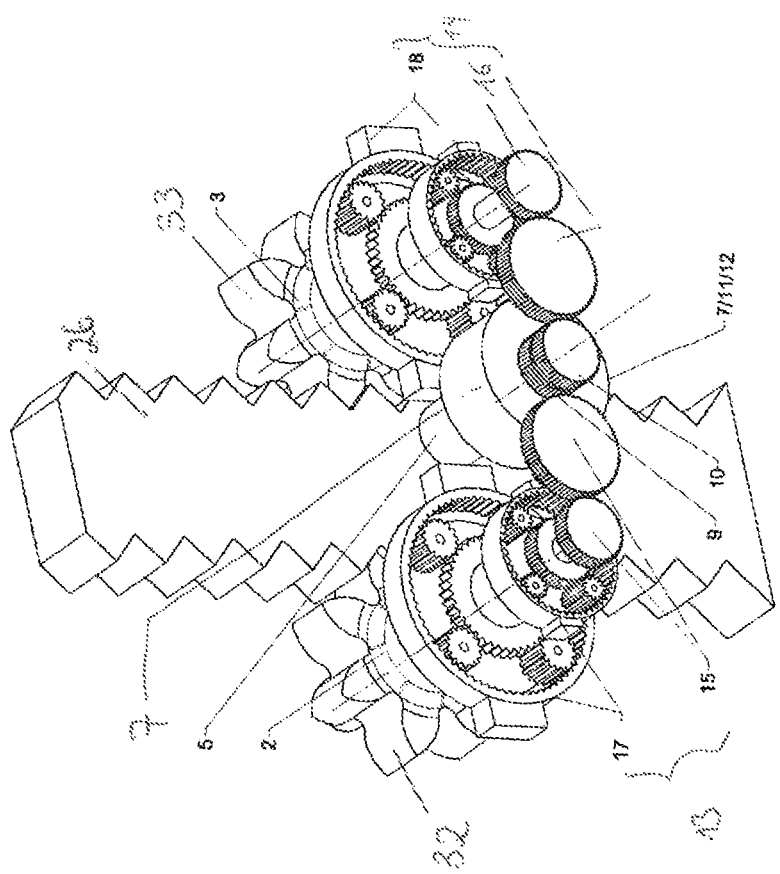

According to the embodiment of FIG. 5a and FIG. 5b, the motor unit 5 may be placed between the two drive shafts 2, 3. As seen in a direction along the centreline CL of the output shaft 28, the motor unit 5 is, in this embodiment, positioned behind the gear system 7.

In this embodiment, the motor unit 5 of a drive unit 4 may be placed between the final planetary gear systems 17 and 18. In this embodiment, an output shaft 28 of the motor unit 5 and/or an input shaft 8 of the compound differential planetary gear system 7 may extend at least partly through a coupling unit 29 which couples the ring gears of the final planetary gear systems 17 and 18, as can be seen in FIG. 5a. For simplicity's sake, the coupling unit 29 is not shown in FIG. 5b.

According to the embodiments of FIG. 4a, FIG. 4b, FIG. 5a or FIG. 5b, a final gear system 13, 14 is positioned between the output shafts 9, 10 of the compound differential planetary gear system 7 and the drive shafts 2, 3 respectively. The final gear set 13, 14 comprises in this embodiment a transverse gear system 15, 16 and a final planetary gear system 17, 18.

Various embodiments of the gear system 7 may be used. FIGS. 1a, 1b, 2a, 2b, 3a, 3b show different embodiments, and various embodiments may be implemented in the drive units, as shown for example in FIG. 4a, FIG. 4b, FIG. 5a, FIG. 5b, etc.

Figure 6A:
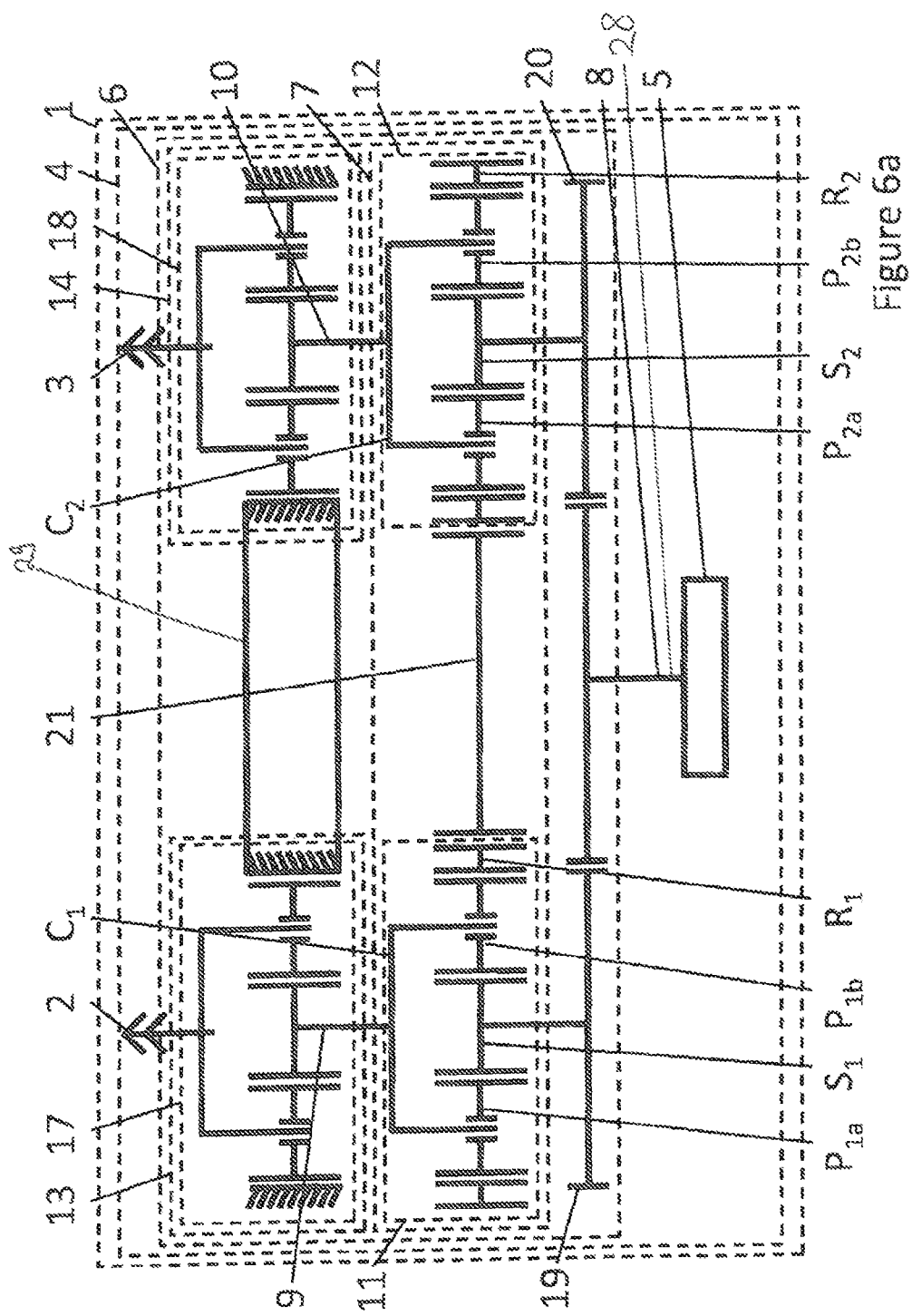
FIG. 6a shows a schematic view of a sixth embodiment of a drive system.
Figure 6B:
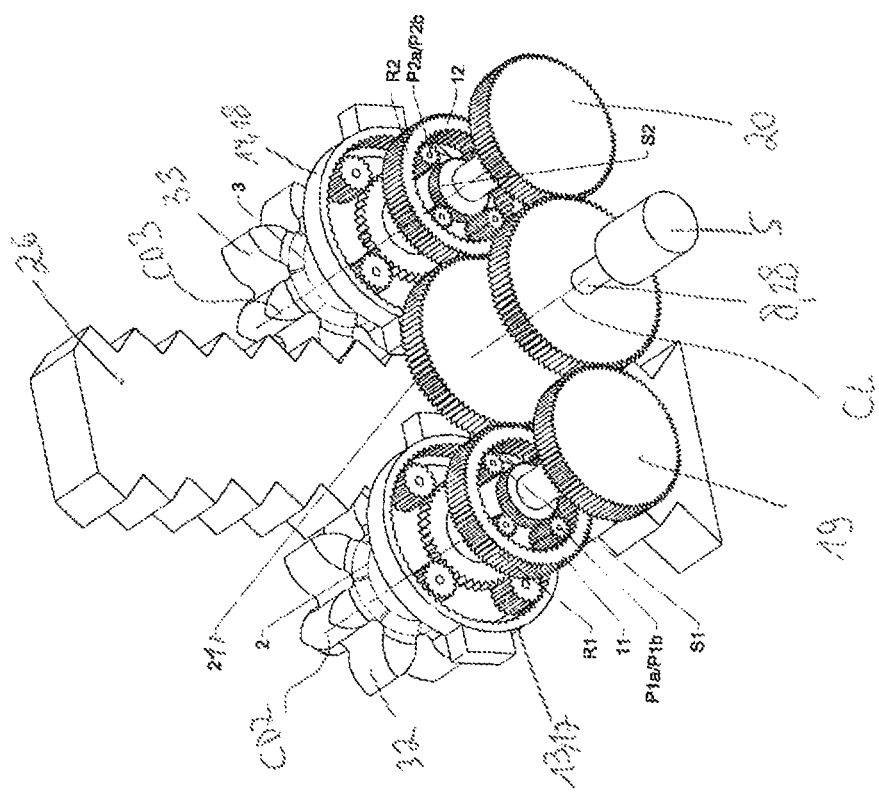

A further embodiment is shown in FIG. 6a and FIG. 6b. According to this embodiment, the two planetary gear sets 11, 12 may be arranged beside each other, whereas in other embodiments the planetary gear sets 11, 12 may be arranged in line with each other, for example behind each other. The planetary gear system 7 shown in the embodiments of FIG. 6a and FIG. 6b may have an input shaft 8 that drives two sun gears S1 and S2, via input gears 19, 20. Both sun gears S1 and S2 may have, according to this embodiment, a common, albeit divided, input shaft 8. Here, the carriers C1 and C2 of the planet gears P1a, P1b, P2a, P2b are arranged as output shafts 9, 10 of the planetary gear system 7 that drive the drive shafts 2, 3, via the final planetary gear systems 17, 18. The final gear systems 13, 14 in this embodiment comprise the final planetary gear systems 17, 18 for coupling between the output shafts 9, 10 and the drive shafts 2, 3. The final gear systems 13, 14 may be coupled to each other to create a gear train 6 with reduced reactor torque, or that is free, or substantially free, from reaction torque, for example via the coupling unit 29. The rings R1 and R2 may be coupled to each other via an intermediate gear 21, to create the differential planetary gear setup. According to this embodiment, the motor unit 5 may be positioned centrally between the drive shafts 2, 3.

Figure 7B:
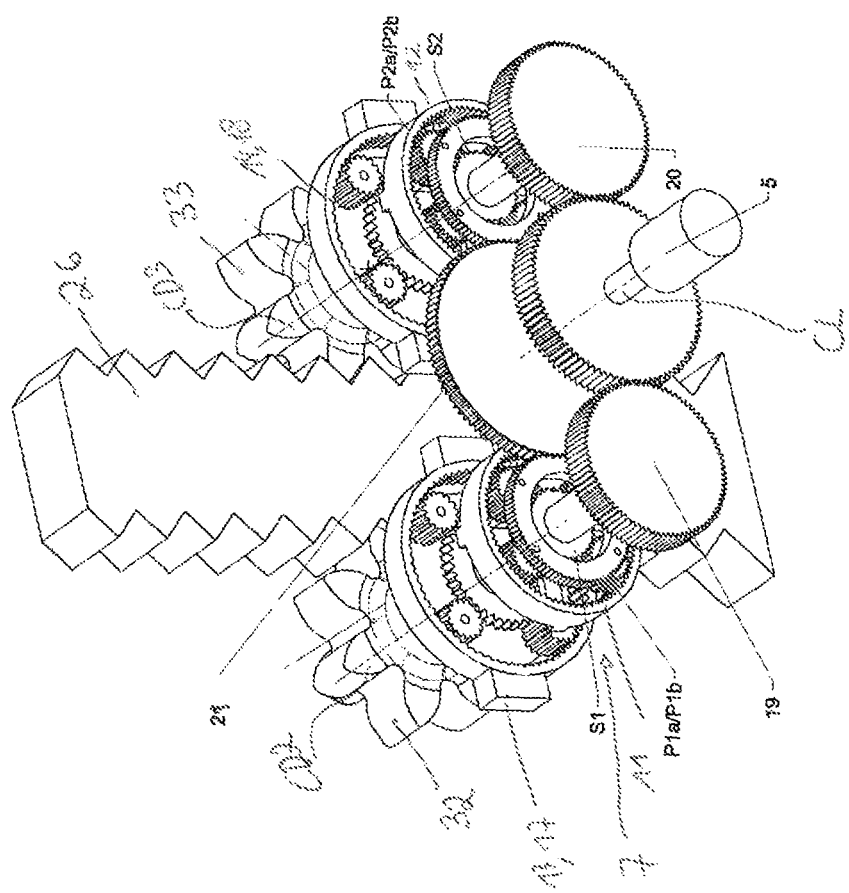

According to the embodiment of FIG. 7a and FIG. 7b the two planetary gear sets 11 and 12 may be arranged beside each other. According to the embodiment of FIG. 6a, FIG. 6b the compound differential planetary gear setup may be created by coupling the carriers C1 and C2 of planetary gear sets 11 and 12 via an intermediate gear 21 and using the ring gears R1 and R2 as output shaft 9, 10. According to this embodiment, the motor unit 5 may be positioned centrally between the drive shafts 2, 3.

The embodiments of FIG. 6a, FIG. 6b, FIG. 7a and FIG. 7b further comprise an input gear set positioned between the output shaft 28 of the motor unit 5 and the input shafts of the planetary gear systems 11, 12. The input gear set may comprise a first input gear 19 and a second input gear 20. In an embodiment, the input gear set may provide for a single reduction stage from the motor unit 5 towards the planetary gear system 7. In an embodiment, the input gear set may split the power output from the motor unit 5 into a part for the planetary gear set 11 and into a part for the planetary gear set 12.

Figure 8A:
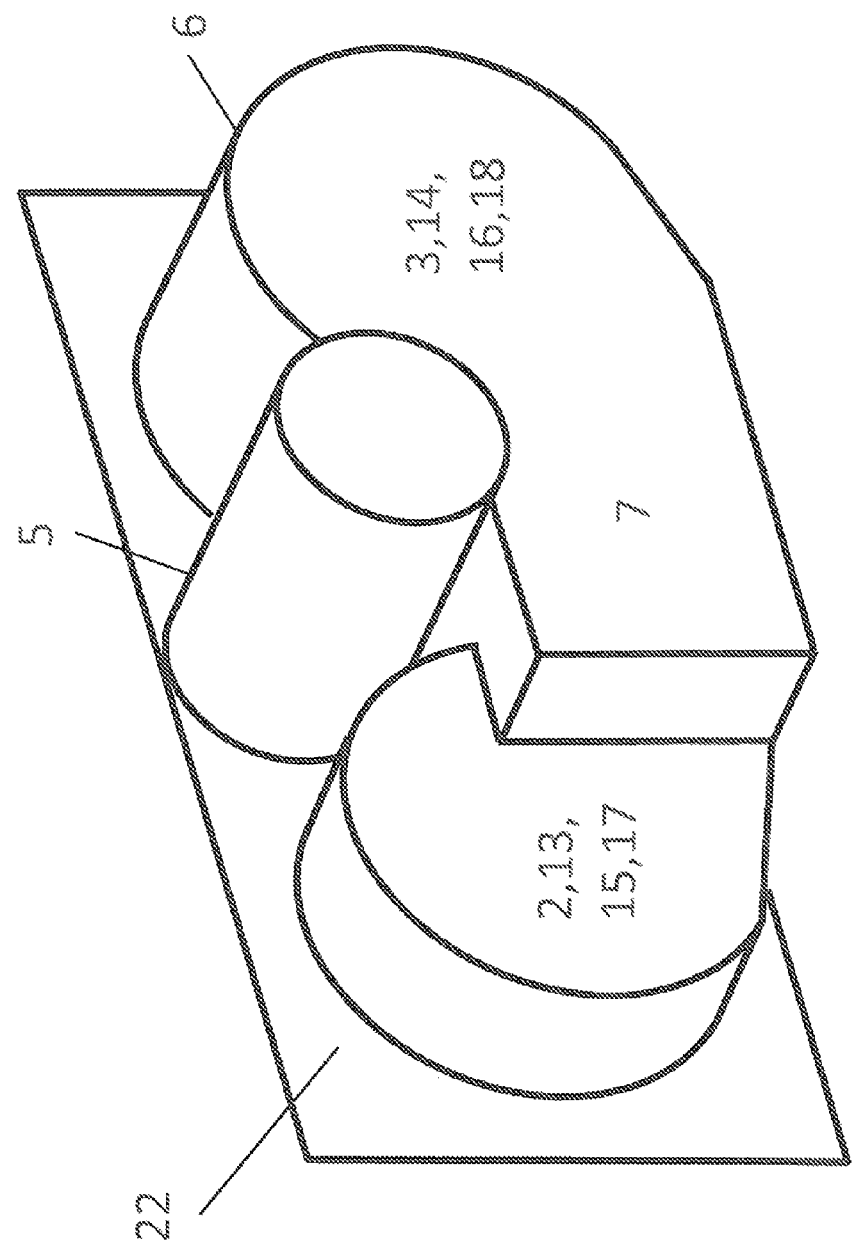
FIG. 8a shows a perspective view of a housing of a drive system.

FIG. 8a shows a perspective view of a drive unit 4 incorporating the configuration of the embodiment shown in FIG. 4a, which may provide a compact configuration of the drive unit 4. According to the embodiment of FIG. 8a, the motor unit 5 may be positioned in a central position of the gear train 6 encompassing the compound differential planetary gear system 7 in a central, or substantially central, position with respect to the drive unit 4. The output shaft 28 of the motor unit 5 may be positioned aside, e.g., beside, above or beneath, or otherwise in line with, the input shaft 8 of the compound differential planetary gear system. For example, the shafts 8, 28 can be coupled by a coupling element comprising e.g., one or more gear sets, gears and/or other coupling elements such as a chain or a belt. In an embodiment, the final gear system 13, comprising the transverse gear system 15 and the final planetary gear system 17 connecting to drive shaft 2, and the final gear system 14 comprising the transverse gear system 16 and the final planetary gear system 18 connecting to drive shaft 3, are arranged adjacent the gear train 6. The gear train 6 may be for example arranged in a housing 22 such that it can be relatively easily installed, maintained and/or replaced, such that costs may be reduced. The motor unit 5 may comprise an electric motor, but may also comprise a hydraulic motor or a combination of different motor types. Also, in an embodiment, the motor unit 5 may comprise gear sets to direct the output of the motor to the input shaft 8 of the gear train 6.

In another embodiment, a single planetary gear set may be coupled to the motor unit. Such embodiments are, for example, shown in FIG. 10a, FIG. 10b, FIG. 11a, and FIG. 11b. The output shaft 28 of the motor unit 5 may, for example, be coupled to the sun gear S1 as input of the planetary gear set 11. The ring gear R1 and the carrier C1 may be used as output shafts that are coupled to the drive shafts 2, 3. For example, the ring gear R1 may be coupled to one output shaft 9 which may be coupled to one drive shaft 2, as for example according to the embodiments of FIG. 11a and FIG. 11b. The carrier may be coupled to another output shaft 10, which may be coupled to another drive shaft 3. The carrier may be coupled to the output shaft 10 via gears 21, 27 as for example according to the embodiments of FIG. 11a and FIG. 11b. Alternatively, the carrier may be coupled directly to the output shaft 10. In an embodiment, a final gear system 13, 14 may be positioned between the output shaft 9, 10 and the drive shaft 2, 3 coupled to it, respectively. In an embodiment, the final gear system 13, 14 may comprise a transverse gear system 15, 16, for example a spur gear, or the final gear system 13, 14 may comprise a final planetary gear system 17, 18, or the final gear system may comprise a transverse gear system and a final planetary gear system. In an embodiment, one output shaft may be coupled to the drive shaft via a transverse gear system, and/or the other output shaft may be coupled to the drive shaft via a final planetary gear system. Many variants may be implemented. In an embodiment the output shaft of the motor unit may be coupled directly to the sun gear of the planetary gear system. In an embodiment, the output shaft of the motor unit may be coupled to the sun gear of the planetary gear system via one or more input gears and/or one or more intermediate gears. In an embodiment, the output shaft 28 of the motor unit 5 may be centrally between the drive shafts 2, 3, as for example according to the embodiments of FIG. 10a and FIG. 10b. In another embodiment, the output shaft 28 may be eccentric with respect to the drive shafts 2, 3, as for example according to the embodiments of FIG. 10b and FIG. 11b. In an embodiment, the carrier C1 may be coupled to the output shaft 9 and the ring gear R1 may be coupled to the output shaft 10, as for example according to the embodiments of FIG. 10a and FIG. 10b. The ring R1 may be coupled to the output shaft 10 directly or via gears 21, 27, according to the embodiment of FIG. 10b. In the FIGS. 10a, 10b, 11a, 11b, a coupling unit between the final gear systems 13, 14 is shown, but in other embodiments, this coupling unit may be absent or omitted.

In an embodiment, the housing 22 has first connecting elements to connect with the motor unit 5, which is in this embodiment positioned centrally, or substantially centrally, with respect to the housing 22, and second connecting elements for connection with the drive shafts 2, 3 of climbing pinions 32, 33. The connecting elements are not shown in the figure here, but may comprise bolts, clamping fingers, pins etc. Various embodiments for the connecting elements may be possible. For example, the connecting elements may include a ring with bores on the housing 22 and/or e.g., on the motor unit 5. Through the bores, bolts may be positioned to connect the rings firmly to each other.

Figure 8B:
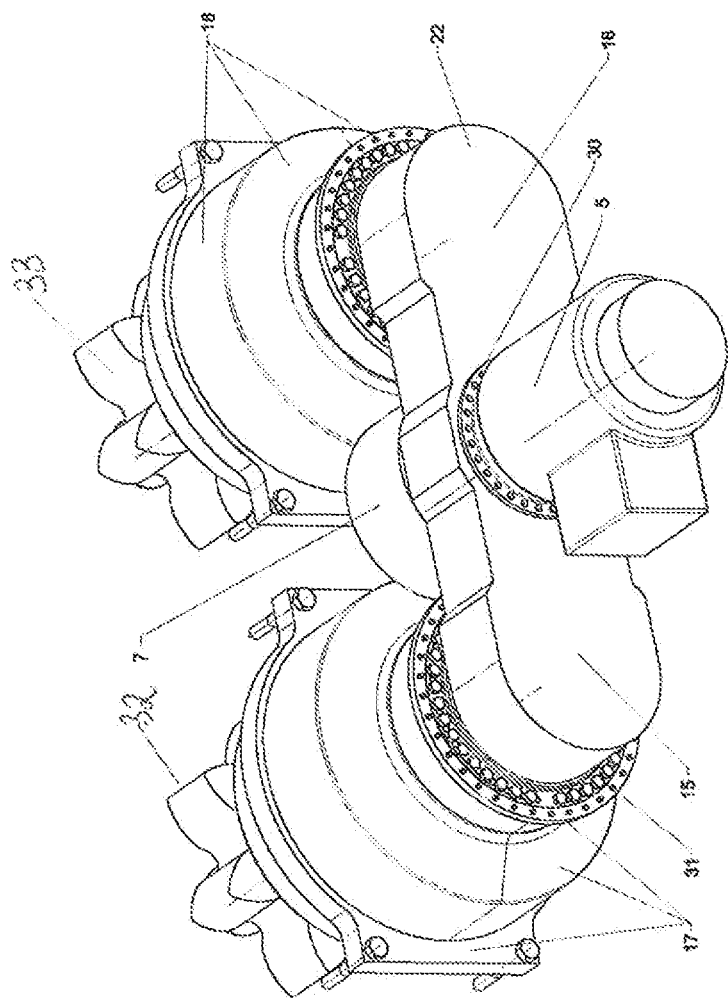
FIG. 8b shows a schematic perspective view of a drive system comprising multiple housings.
Figure 10A:
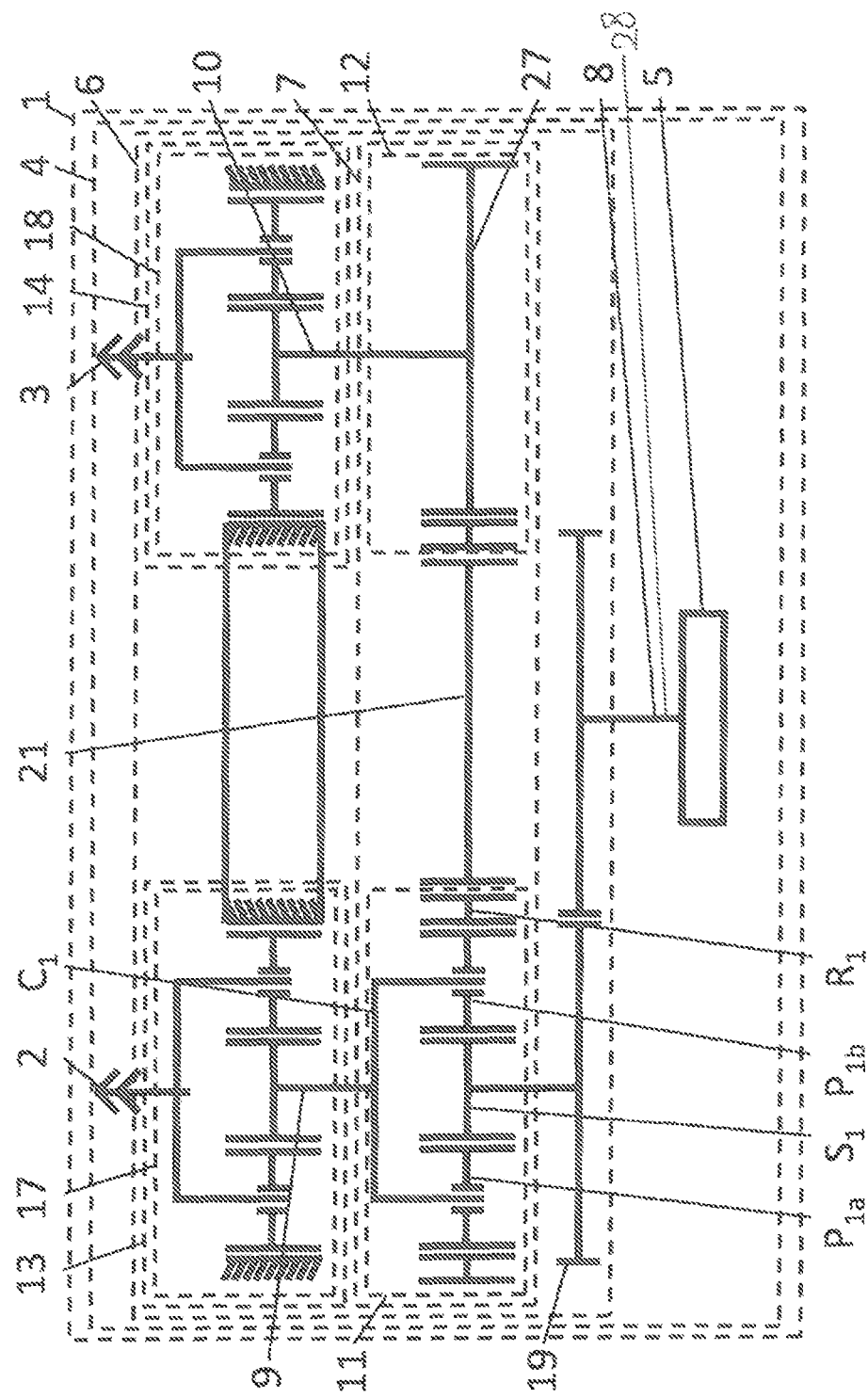
FIG. 10a shows a schematic view of another embodiment of a drive system.
Figure 10B:
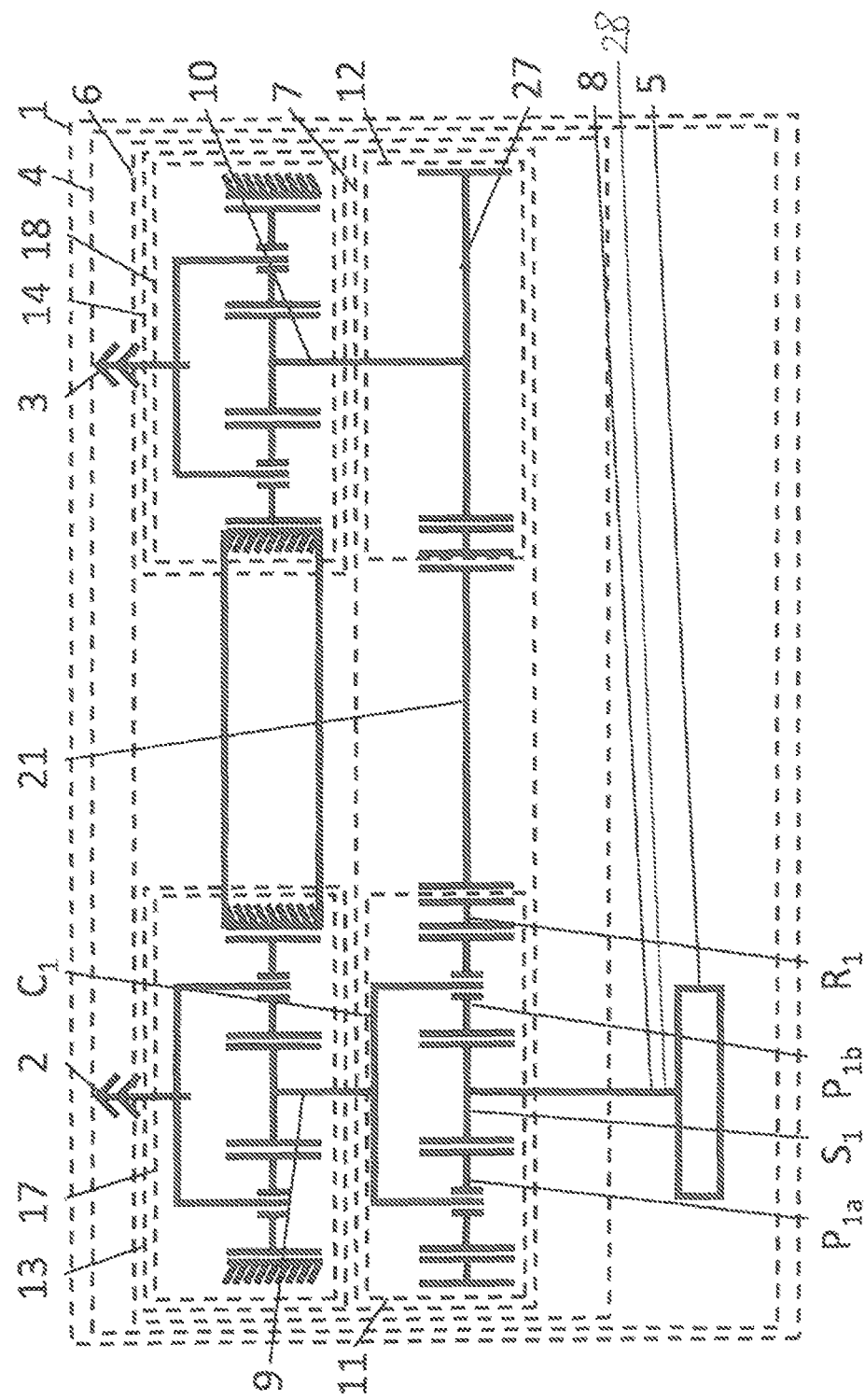
FIG. 10b shows a schematic view of another embodiment of a drive system.
Figure 11A:
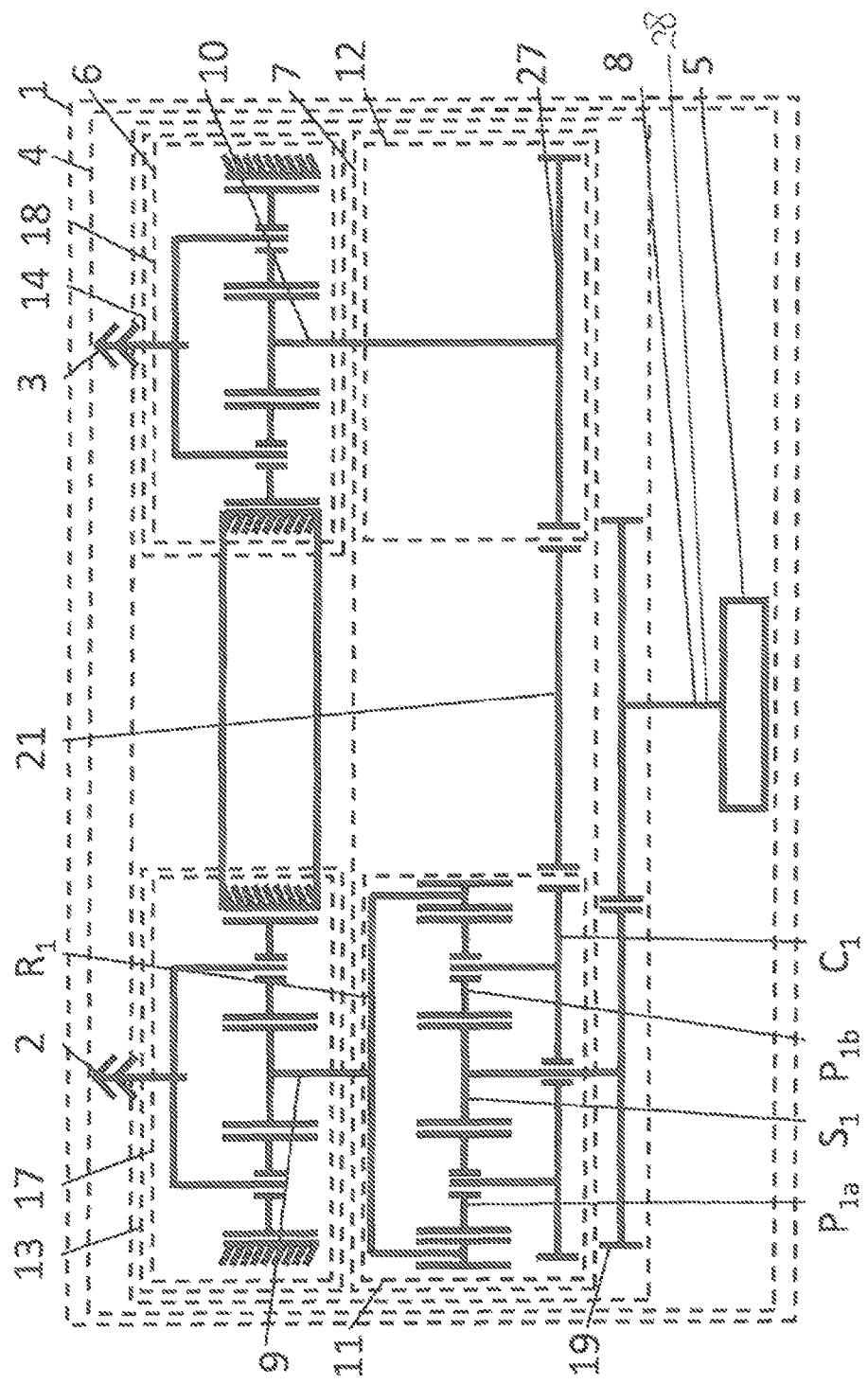
FIG. 11a shows a schematic view of another embodiment of a drive system.
Figure 11B:
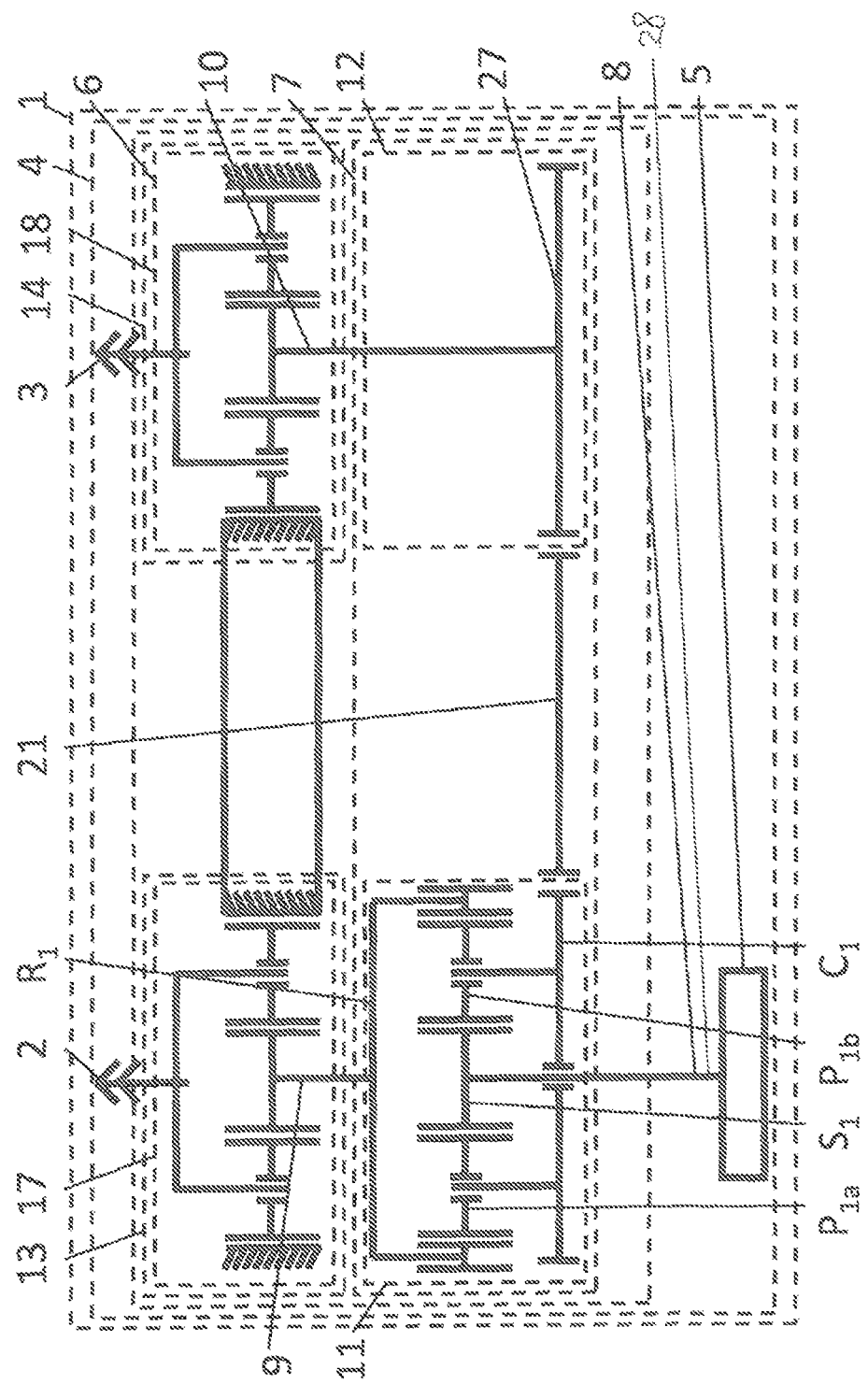
FIG. 11b shows a schematic view of another embodiment of a drive system.

FIG. 8b shows an embodiment of a drive system 1 comprising multiple housings. According to this embodiment, there may be a housing 22 enclosing the transverse gear systems 15, 16. The gear system 7 may be enclosed in a housing, as well as the final planetary gear systems 17, 18, which may be enclosed in individual (e.g., separate) housings. The housings may be coupled to each other by connecting elements, such as connecting elements 30, 31, for example, shown here. The connecting elements may include a ring provided with bores in which bolts can be fastened. Also, two rings may be provided which may be fastened by nuts and bolts. Many variants are possible for the connecting elements.

The motor unit 5 may be placed between, substantially between, or at least partly between, the final planetary gear systems 17 and 18. Alternatively, the motor unit 5 may be positioned eccentrically with respect to the drive unit, e.g., eccentrically alongside of the drive unit and/or eccentrically outside of the gear train housing.

FIG. 9a and FIG. 9b schematically show a top and side view of an embodiment of a jack-up offshore structure 23. The offshore structure 23 comprises a platform 24 and legs 25. According to this embodiment, there may be three legs 25. For the sake of example, there is one cylindrical leg 25' shown and two triangular legs 25". The legs of a single offshore structure may all have the same cross-sectional shape. The platform 24 is adjustable along the legs 25. Typically, the platform 24 may be a floating pontoon and the platform 24 may be adjustable between a floating position, an installation position and a working position. In the floating position, the legs 25 may extend substantially above the platform 24, such that the offshore structure can be towed towards its offshore location. In the installation position, the platform 24 may float on the water surface while the legs 23 are being adjusted to install the legs 25 to the sea bottom. In the installation position, the legs 25 may extend substantially below the platform 24, and the platform 22 may be above water level. Thereafter, the platform 24 may be adjusted towards a working position in which the platform 24 extends above the water level.

For adjusting the platform 24 with respect to the legs 25, in an embodiment the legs may be provided with racks 26 in which pinions 32, 33 engage. The pinions 32, 33, may, according to this embodiment, be connected to the drive shafts 2, 3 of a drive unit 4 comprising a gear system 7 for driving the two pinions 32, 33 simultaneously. In an embodiment providing the drive unit 4 with a differential functionality, allows for the compensation, or substantial compensation, of variations in torque of the pinions 32, 33 that are simultaneously driven.

In an embodiment providing the gear train 6 in a housing 22, the drive system 1 may be relatively simply connected to the pinions 32, 33. Also, in case of maintenance or damage, the respective drive unit 4 and/or respective housing may be removed relatively easily and a spare drive unit 4 and/or housing may be put in place, such that downtime, maintenance costs and/or repair costs may be reduced. It is noted that it may be possible to carry a spare part drive unit 4 and/or a spare part housing on the offshore structure 23, according to one embodiment. According to an alternative embodiment, the drive unit may comprise several housings which may be assembled into one drive unit on the platform, for example for ease of installation. For example, the drive unit may comprise three housing parts. A first housing may enclose the motor unit 5, the gear system 7 and, when available, the transverse gear systems 15, 16. A second housing may enclose the final planetary gear system 17. A third housing may enclose a final planetary gear system 18. Many variants of the housings may be implemented.

In case of the embodiment of the triangular leg 25", each corner may be provided with a rack-and-pinion adjustment system comprising the drive system 1. In this embodiment, each corner has two racks 26, wherein in each rack 26 a pinion 32, 33 is engaged. Typically, multiple pinions are engaged per rack 26. By driving two pinions 32, 33 with a single motor unit, a significant simplification may be achieved compared to the situation in which a single motor unit per pinion is used. The two pinions 32, 33 that may be driven simultaneously by a single motor unit can be arranged on the same rack above each other, or can be arranged on different racks at approximately the same level with respect to each other. In an embodiment they may be horizontally arranged. In another embodiment, they may be vertically arranged.

According to the embodiment shown in FIGS. 9a and 9b, the racks 26 may be in a standing position along which the pinions 32, 33 can move up and down. In another embodiment, the racks 26 may be oriented in a lying position along which the pinions 32, 33 can be moved forward and backward, for instance when moving a cantilever outwardly and inwardly with respect to an offshore platform.

Many variants will be apparent to the person skilled in the art. Embodiments are described in which a drive shaft is connected to a pinion engaging a rack, for example on a jack-up offshore structure. Also other applications may be possible, for instance applications that may provide for simultaneous adjustment of two, or more, objects. All variants are understood to be comprised within the scope of the following claims.

Overall, embodiments of the invention relate to drive units having gear trains comprising compound differential planetary gear systems, as described herein. Other embodiments relate to gear boxes comprising gear trains for use in these drive units. Further embodiments relate to drive systems for driving multiple drive shafts, comprising a multiple drive units as described herein. Yet further embodiments comprise offshore structures, such as those having a jackable platform and jacking systems, comprising drive systems as described herein.

In view of the present disclosure, it will be seen that several advantages may be achieved and other advantageous results may be obtained. Those having skill in the art, with the knowledge gained from the present disclosure, will recognize that various changes could be made in the above embodiments without departing from the scope of the present invention.

| | |
|---|---|
| 1 | Drive system |
| 2 | Drive shaft 1 |
| 3 | Drive shaft 2 |
| 4 | Drive unit |
| 5 | Motor unit |
| 6 | Gear train |
| 7 | differential planetary gear system |
| 8 | Input shaft |
| 9 | Output shaft 1 |
| 10 | Output shaft 2 |
| 11 | Compound planetary gear set 1 |
| 12 | Compound planetary gear set 2 |
| 13 | Final gear system 1 |
| 14 | Final gear system 2 |
| 15 | Transverse gear system 1 |
| 16 | Transverse gear system 2 |
| 17 | Final planetary gear system 1 |
| 18 | Final planetary gear system 2 |
| 19 | Input gear 1 |
| 20 | Input gear 2 |
| 21 | Intermediate gear |
| 22 | Housing |
| 23 | Jack-up offshore structure |
| 24 | Platform |
| 25 | Legs |
| 26 | Rack |
| 27 | gear |
| 28 | Output shaft of the motor unit |
| 29 | Coupling unit |
| 30 | connecting elements |
| 31 | connecting elements |
| 32 | pinion |
| 33 | pinion |
| $S_1$ | sun gear 1 |
| $S_2$ | sun gear 2 |
| C | coupled carrier |
| $C_1$ | carrier 1 |
| $C_2$ | carrier 2 |
| $P_{1a}$ | planet gear 1a |
| $P_{1b}$ | planet gear 1b |
| $P_{2a}$ | planet gear 2a |
| $P_{2b}$ | planet gear 2b |
| R | coupled ring gear |
| $R_1$ | ring gear 1 |
| $R_2$ | ring gear 2 |
| $X_A$ | planet axle A |
| $X_B$ | planet axle B |
| CL | centreline output shaft motor unit |
| CD2 | centreline drive shaft 1 |
| CD3 | centreline drive shaft 2 |

The invention claimed is:
1. A drive system for driving multiple drive shafts simultaneously, comprising a number of drive units, each for driving at least two drive shafts, wherein the drive units each comprise a motor unit and a gear train coupled to the motor unit, wherein the gear train comprises a compound differential planetary gear system having at least one input shaft coupled to the motor unit and at least two output shafts of which each output shaft is arranged for driving a drive shaft, wherein drive shafts driven by each drive unit comprise pinions that are arranged on different racks alongside each other, and wherein the compound differential planetary gear system comprises at least two planetary gear sets with different form factors that are coupled to each other.

2. The drive system according to claim 1, wherein sun gears of the respective planetary gear sets are coupled to each other via the input shaft.

3. The drive system according to claim 1, wherein a sun gear of one of the planetary gear sets is omitted.

4. The drive system according to claim 1, wherein either one of a carrier or a ring gear of the planetary gear system is coupled to one of said at least two output shafts.

5. The drive system according to claim 1, wherein a final gear system, comprising a transverse gear system, or a final planetary gear system or both, is arranged between each output shaft and the drive shaft corresponding to the output shaft.

6. The drive system according to claim 1, further comprising two final gear systems that are coupled to each other to provide a reaction-torque free gear train.

7. The drive system according to claim 1, wherein the racks are positioned in a standing position for driving the pinions up or down along the racks.

8. The drive system according to claim 1, wherein the racks are positioned in a lying position for driving the pinions forwards or backwards along the racks.

9. The drive system according to claim 1, comprising an integrated load measuring system, which allows determination of the torque transmitted through the drive system.

10. An offshore structure comprising the drive system according to claim 1.

11. The drive system according to claim 1, wherein the gear train is arranged in one or more housings.

12. The drive system according to claim 11, wherein the one or more housings of the gear train comprises first connecting elements for connection with the motor unit and second connecting elements for connection with the drive shafts.

13. The drive system according to claim 1, wherein the motor unit has an output shaft that is aligned with the input shaft of the gear train.

14. The drive system according to claim 1, wherein the motor unit has an output shaft aligned with the at least one input shaft of the compound differential planetary gear system and/or integrated therewith.

15. The drive system according to claim 1, wherein the motor unit comprises an output shaft, having a motor unit output shaft centerline, and wherein first and second drive shafts, of said at least two drive shafts, have respective first and second drive shaft centerlines, and wherein the motor unit output shaft centerline is positioned in between the first and second drive shaft centrelines.

16. The drive system according to claim 1, wherein the motor unit is placed at least partly between the at least two output shafts of the compound differential planetary gear system.

17. The drive system according to claim 1, wherein an input gear set is placed between the motor unit and the input shaft.

18. A gear box comprising a gear train for use in a drive unit of the multiple number of drive units of the drive system according to claim 1.

19. The gear box according to claim 18, wherein the gear train is arranged in one or more housings.

* * * * *